United States Patent [19]
Yamamoto et al.

[11] Patent Number: 5,099,361
[45] Date of Patent: Mar. 24, 1992

[54] PROJECTION LENS AND PROJECTION TELEVISION SYSTEM USING THE SAME

[75] Inventors: Yoshiharu Yamamoto, Toyonaka; Yasuo Nakajima, Ibaraki, both of Japan

[73] Assignee: Matsushita Electric Industrial Co., Ltd., Osaka, Japan

[21] Appl. No.: 486,101

[22] Filed: Feb. 28, 1990

[51] Int. Cl.[5] .................................................. G02B 9/64
[52] U.S. Cl. .................................... 359/708; 359/726; 359/754
[58] Field of Search .............. 350/463, 458, 349, 415, 350/412, 432, 331 R

[56] References Cited

U.S. PATENT DOCUMENTS 3,864,026  2/1975  Glatzel ................................. 350/458
4,875,064  10/1989  Umeda et al. ................... 350/331 R

FOREIGN PATENT DOCUMENTS 64-19317  1/1989  Japan .

OTHER PUBLICATIONS

"Optical System for High Definition Liquid Crystal Projection TV", Development Research Lab., Matsushita Electric Industrial Co., Ltd.

Primary Examiner—Bruce Y. Arnold
Assistant Examiner—Rebecca D. Gass
Attorney, Agent, or Firm—Wenderoth, Lind & Ponack

[57] ABSTRACT

A projection lens for projecting images displayed on an image display device having angle-of-view dependency has high image focusing characteristics corresponding to high definition images, wide field angle, and telecentric characteristics. In addition, a projection television system using the same can be minimized in its size.

17 Claims, 7 Drawing Sheets

FIG. 1

FIG. 2(a)
SPHERICAL ABERRATION

FIG. 2(b)
ASTIGMATISM

FIG. 2(c)
DISTORTION

FIG. 3(a)
SPHERICAL ABERRATION

FIG. 3(b)
ASTIGMATISM

FIG. 3(c)
DISTORTION

FIG. 4(a)
SPHERICAL ABERRATION

FIG. 4(b)
ASTIGMATISM

FIG. 4(c)
DISTORTION

FIG. 5(a)
SPHERICAL ABERRATION

FIG. 5(b)
ASTIGMATISM

FIG. 5(c)
DISTORTION

FIG. 6(a)

SPHERICAL ABERRATION

FIG. 6(b)

ASTIGMATISM

FIG. 6(c)

DISTORTION

FIG. 7(a)

SPHERICAL ABERRATION

FIG. 7(b)

ASTIGMATISM

FIG. 7(c)

DISTORTION

FIG. 8(a)

SPHERICAL ABERRATION

FIG. 8(b)

ASTIGMATISM

FIG. 8(c)

DISTORTION

FIG. 9(a)

SPHERICAL ABERRATION

FIG. 9(b)

ASTIGMATISM

FIG. 9(c)

DISTORTION

FIG. 10(a)

SPHERICAL ABERRATION

FIG. 10(b)

ASTIGMATISM

FIG. 10(c)

DISTORTION

FIG. 11(a)

SPHERICAL ABERRATION

FIG. 11(b)

ASTIGMATISM

FIG. 11(c)

DISTORTION

FIG. 12

PROJECTION LENS AND PROJECTION TELEVISION SYSTEM USING THE SAME

BACKGROUND OF THE INVENTION

1. Field of the Invention

The present invention relates to a projection television system in which images formed, by means of electric signals as a result of changes of transmittance and reflectivity of the light, on an image display element are magnified and projected on a screen, and to projection lens preferable to be used therein.

2. Description of the Prior Art

There has been a projection television system as the display devices with large image planes. The CRT type projection television systems in which images of high brightness on the CRT are projected on the screen by means of the projection lens have been already used practically. On the other hand, a liquid crystal type projection television system in which images on a liquid crystal display element forming the images by changing transmittance and reflectivity of the light by means of video signals are magnified and projected on a screen are starting to be developed.

In the case of projecting images on the liquid crystal display element, there occur problems, which are free from the CRT projection, as described below:

(1) Considering the angle-of-view dependency of the liquid crystal display element, a bundle of rays radiated in a specific range of angle toward the liquid crystal display element has to be utilized as a projection bundle of rays in order to project the images, which are formed on the liquid crystal display element according to the video signals, on the screen with high contrast. Therefore, the projection lens are required to have telecentric characteristics that off-axis principal rays become vertical to the liquid crystal display element.

(2) The liquid crystal display element is driven by matrix electrodes, so that it is difficult to electrically compensate picture distortion of the projected images not like the projection system using the CRT devices. Accordingly, the distortion aberration of the projection lens must be as small as possible.

These problems generally become a large obstacle to realize the wide picture angle of the projection lens which is necessary to minimize the size of the projection television system. These problems are not only against the liquid crystal display element but also against other image display elements which forms the images as a result of changes of transmittance and reflectivity of the light by means of video signals using birefringence or rotatory polarization characteristics such as electric optical crystal and PLZT or the like having angle-of-view dependency.

SUMMARY OF THE INVENTION

An object of the present invention is to provide a projection television system with high performance and a lens preferable to be used therein having low distortion aberration and capability to project the images on an image display element having angle-of-view dependency forming the images as changes of transmittance and reflectivity of the light by means of the electric signals in order to solve the above problems which occur due to the difference from the image projection of the CRT in case of projecting the images on the image display element having the angle-of-view dependency.

In order to achieve the above object, the projection television system of the present invention comprises: a light source; an image display element having angle-of-view dependency forming images as changes of transmittance or reflectivity by means of image electric signals; a projection lens magnifyingly projecting a bundle of image rays achieved by transmitting the rays through said image display element or by reflecting the rays against said image display element, wherein said projection lens is provided so as to make off-axis principal rays substantially vertical to said image display element and has predetermined telecentric characteristics in order to obtain projection images with high contrast. It is desirable for the projection lens to have a wide field angle particularly in order to achieve a compact transmission type projection television system. Accordingly, the projection lens has a constitution that an inverted telephoto type front lens group and a rear lens group having a front focal point nearby an exit pupil of said front lens group are provided.

According to the above constitution, the wide field angle can be achieved because the front group is made of the inverted telephoto type lens, and the telecentric characteristics can be obtained by arranging the rear lens group having a front focal point nearby the exit pupil of said front lens group, so that the images on the image display element having angle-of-view characteristics can by magnifyingly projected on the screen with high contrast.

As described above, according to the present invention, an excellent image with high contrast can be displayed, especially, a transmission type projection television system corresponding to the high definition of the images can be realized, and it is of great value in industry.

BRIEF DESCRIPTION OF THE DRAWINGS

FIGS. 2 (a), (b) and (c) to 11 (a), (b) and (c) are characteristics graphs of spherical aberration, astigmatism aberration, and distortion aberration of the first to tenth embodiments.

DETAILED DESCRIPTION OF THE PREFERRED EMBODIMENTS

The present invention is described hereinafter referring to the drawings.

Figure 1:
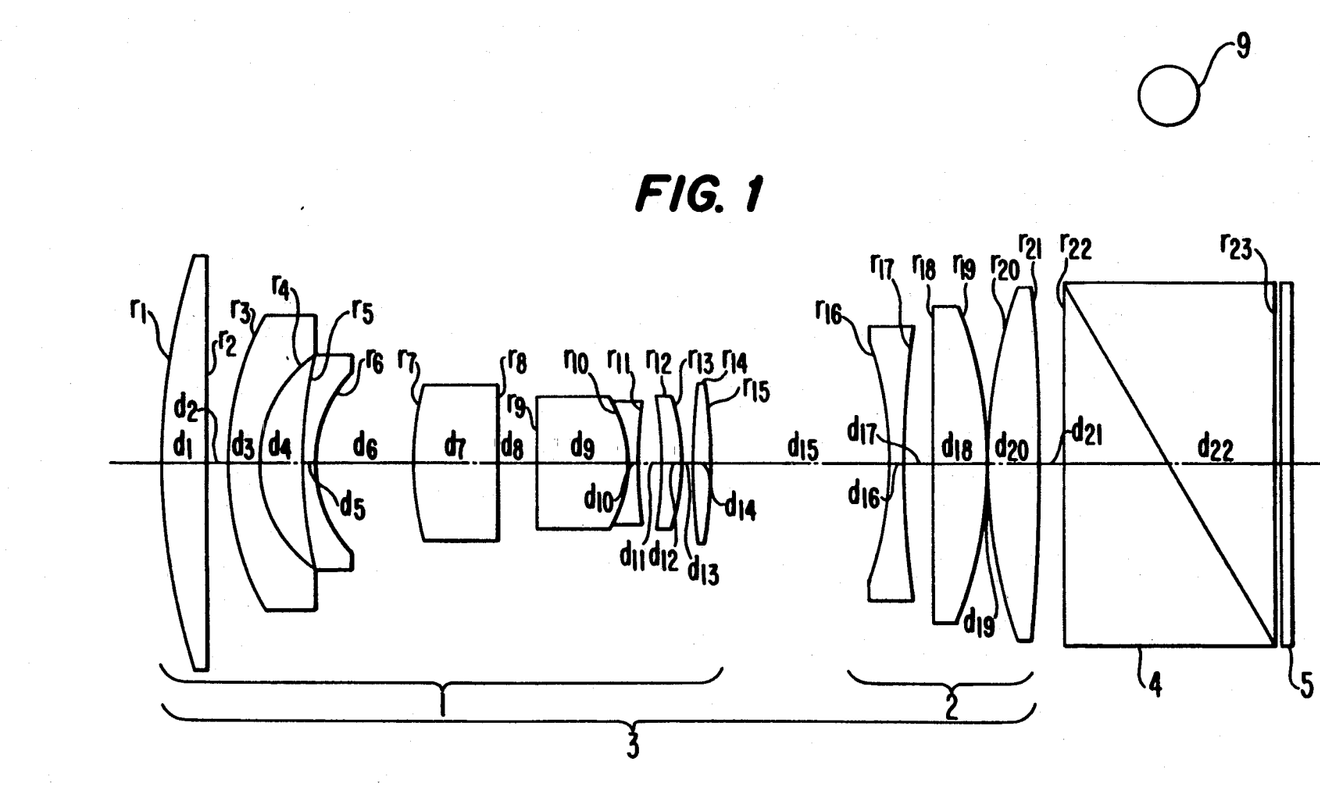
FIG. 1 is a view showing the configuration of a projection lens of a first embodiment.

FIG. 1 is a view showing a schematic configuration of a projection television system, in which the projection lens of a first embodiment of the present invention is employed, using a reflection type liquid crystal display element as an image display element having angle-of-view dependency. In FIG. 1, projection lens 3 constituted of a front lens group 1 and a rear lens group 2 having a front focal point nearby an exit pupil of said front lens group 1, a polarizing beam splitter 4, and a reflection type liquid crystal display element 5 are shown respectively. Light rays radiated from a light source 9 through an upper portion of the polarizing beam splitter 4 are refracted toward the reflection type liquid crystal display element 5 by means of the polarizing beam splitter 4, and enter into the reflection type liquid crystal display element 5. The light intensity-modulated according to images on the reflection type liquid crystal display element 5, then travels through the polarizing beam splitter 4 and projects magnified images of the reflection type liquid crystal display element 5 on a screen by means of the projection lens 3.

The projection lens 3 includes the front lens group 1 and the rear lens group 2 which are constituted by 7 lens pieces and 3 lens pieces respectively. Namely, starting from the screen side, a first lens is a positive lens, a second lens is a negative meniscus lens having its convex surface facing the screen side, a third lens is a negative meniscus having its convex surface facing the screen side, a fourth lens is a bi-convex lens, a fifth lens is a negative meniscus lens including a cemented surface and having its convex surface facing the screen surface, a sixth lens is a positive meniscus lens having its concave surface facing the screen side, a seventh lens is a bi-convex lens, an eight lens is a bi-concave lens, a ninth lens is a positive lens, and a tenth lens is a bi-convex lens. As described above, the first to seventh lens form the front lens group 1 of the inverted telephoto type lens constitution, and the eighth to tenth lens form the rear lens group 2 having the front focal point nearby the exit pupil of the front lens group 1. By means of this constitution, realized are the telecentric characteristics which are required conditions for projecting the images on the reflection type liquid crystal display element with high contrast, and the aberrations such as the distortion aberration are compensated excellently.

In order to achieve these characteristics, it is desirable to meet the following condition.

$$0.8 < f_{1.7}/f < 1.4 \quad (1)$$

f: a total focal length of the entire system $f_{1,7}$: a total focal length of the first to seventh lens The condition (1) defines power distribution of the front lens group 1 toward the entire system. It becomes difficult to meet a predetermined back focus when it goes beyond a lower limit. When it goes beyond an upper limit, the rear lens group has to have excessively large power, so that it becomes difficult to compensate the aberrations, especially the distortion and coma aberrations while keeping the telecentric characteristics.

More desirably, its characteristics improve more by meeting the following condition.

$$0.5 < d_{15}/f < 0.9 \quad (2)$$

f: a total focal length of the entire system $d_{15}$: a distance between surfaces of the seventh and eighth lens The condition (2) defines the distance between the surfaces of the front and rear lens groups 1 and 2. When it goes beyond a lower limit, the power of each lens becomes large in order to maintain the telecentric characteristics, and for the purpose of realizing the telecentric characteristics a symmetric property of the power is destroyed to an even greater extent while the power is originally in an asymmetric arrangement, so that it becomes difficult especially to compensate a lateral chaotic aberration. When it goes beyond an upper limit, it is easier to achieve the telecentric characteristics, but it becomes difficult to meet a predetermined back focus.

It is much more desirable to meet the following conditions, and thus its characteristics improve even more.

$$d_{17}/f < 0.3 \quad (3)$$

$$-1.5 < f_8/f_{9,10} < -1.2 \quad (4)$$

f: a total focal length of the entire system
$d_{17}$: a distance between surfaces of the eighth and ninth lens
$f_8$: a focal length of the eighth lens
$f_{9,10}$: a total focal length of the ninth and tenth lens The conditions (3) and (4) relate particularly to the characteristics of the eighth to tenth lens, namely of the rear lens group 2. When it goes beyond an upper limit of the condition (3), effective diameters of the ninth and tenth lens become large, so that a problem over a required cost comes about. When it goes beyond a lower limit of the condition (4), a Petzval's sum becomes large, so that it becomes difficult to compensate curvature of field. When it goes beyond an upper limit of the condition (4), the distortion aberration easily occurs, so that it becomes difficult to compensate especially circumferences of image angles. In addition, it becomes difficult to compensate outer comas.

To introduce aspheric surface increases degree of freedom on aberration compensation and can realize more excellent image forming characteristics. In the projection lens of the present invention, the compensation of the distortion aberration in particular improves by introducing an aspheric surface into at least one of the first, second, eighth, ninth and tenth lenses. In addition, the aspheric surface can be easily formed, manufacturing costs can decrease, and the lens can have a lighter weight by forming the lens group having large diameters, such as the first and second lens, using plastics.

Each embodiment of the projection lens of the present invention is shown below. In each embodiment, $r_1$, $r_2$, ... represent a radius of curvature of each surface starting from the screen side, $d_1$, $d_2$, ... represent a distance between each of said surfaces, $n_1$, $n_2$, ... represent a refractive index at an e-line of each lens, $v_1$, $v_2$, ... represent a Abbe's number corresponding to the e-line of each of the above lens, surfaces represented by * are the aspheric surfaces. If Z is supposed a displacement amount from a vertex of a lens at a position away from an optical axis of the lens in a radius distance Y of an opening, it can be expressed as $$Z = \frac{Y^2/r}{1 + \sqrt{1 - (K + 1) \cdot (Y/r)^2}} +$$

$$AD \cdot Y^4 + AE \cdot Y^6 + AF \cdot Y^8 + AG \cdot Y^{10}$$

AD, AE, AF, and AG are aspherical coefficients, and K is a conical constant.

| First embodiment | | | |
|---|---|---|---|
| f = 49.86 | | Aperture ratio | 1:2.8 |
| Projection magnification | 16.89 | ω = 36.2° | |
| $f_{1.7}/f$ = 1.08 | | $d_{15}/f$ = 0.72 | |
| $d_{17}/f$ = 0.12 | | $f_8/f_{9.10}$ = −1.42 | |
| $r_1$ = 136.783 | $d_1$ = 8.10 | $n_1$ = 1.51825 | $v_1$ = 63.8 |
| $r_2$ = 961.173 | $d_2$ = 5.18 | | |
| $r_3$ = 69.975 | $d_3$ = 6.00 | $n_2$ = 1.51825 | $v_2$ = 63.8 |
| $r_4$ = 27.036 | $d_4$ = 8.97 | | |

First embodiment -continued

| | | | |
|---|---|---|---|
| $r_5 = 121.495$ | $d_5 = 2.21$ | $n_3 = 1.52555$ | $\nu_3 = 50.5$ |
| $r_6 = 29.715$ | $d_6 = 18.76$ | | |
| $r_7 = 74.902$ | $d_7 = 17.33$ | $n_4 = 1.85503$ | $\nu_4 = 23.7$ |
| $r_8 = -372.104$ | $d_8 = 6.68$ | | |
| $r_9 = 271.686$ | $d_9 = 17.77$ | $n_5 = 1.79013$ | $\nu_5 = 43.9$ |
| $r_{10} = -25.786$ | $d_{10} = 2.00$ | $n_6 = 1.76169$ | $\nu_6 = 27.3$ |
| $r_{11} = 74.081$ | $d_{11} = 4.62$ | | |
| $r_{12} = -81.511$ | $d_{12} = 4.50$ | $n_7 = 1.77622$ | $\nu_7 = 49.4$ |
| $r_{13} = -43.199$ | $d_{13} = 1.49$ | | |
| $r_{14} = 204.097$ | $d_{14} = 4.11$ | $n_8 = 1.79196$ | $\nu_8 = 47.1$ |
| $r_{15} = -122.218$ | $d_{15} = 35.89$ | | |
| $r_{16} = -68.864$ | $d_{16} = 2.66$ | $n_9 = 1.61075$ | $\nu_9 = 40.0$ |
| $r_{17} = 275.832$ | $d_{17} = 6.11$ | | |
| $r_{18} = -1075.96$ | $d_{18} = 10.52$ | $n_{10} = 1.68083$ | $\nu_{10} = 55.1$ |
| $r_{19} = -88.713$ | $d_{19} = 0.25$ | | |
| $r_{20} = 128.275$ | $d_{20} = 10.01$ | $n_{11} = 1.7762$ | $\nu_{11} = 49.4$ |
| $r_{21} = -276.533$ | $d_{21} = 4.70$ | | |
| $r_{22} = 0.000$ | $d_{22} = 41.10$ | $n_{12} = 1.51825$ | $\nu_{12} = 63.8$ |
| $r_{23} = 0.000$ | | | |

Second embodiment

| | | | |
|---|---|---|---|
| $f = 49.82$ | | Aperture ratio | 1:2.8 |
| Projection magnification | 16.94 | $\omega = 36.2°$ | |
| $f_{1.7}/f = 1.05$ | | $d_{15}/f = 0.74$ | |
| $d_{1.7}/f = 0.16$ | | $f_8/f_{9.10} = -1.33$ | |
| $r_1 = 104.034$ | $d_1 = 11.00$ | $n_1 = 1.49384$ | $\nu_1 = 57.4$ |
| $r_2 = 466.780$ | $d_2 = 5.00$ | | |
| $r_3 = 73.295$ | $d_3 = 2.00$ | $n_2 = 1.49384$ | $\nu_2 = 57.4$ |
| $r_4 = 26.295$ | $d_4 = 11.00$ | | |
| $r_5 = 121.495$ | $d_5 = 2.21$ | $n_3 = 1.52555$ | $\nu_3 = 50.5$ |
| $r_6 = 29.715$ | $d_6 = 18.76$ | | |
| $r_7 = 74.902$ | $d_7 = 17.33$ | $n_4 = 1.85503$ | $\nu_4 = 23.7$ |
| $r_8 = -372.104$ | $d_8 = 6.68$ | | |
| $r_9 = 271.686$ | $d_9 = 17.77$ | $n_5 = 1.79013$ | $\nu_5 = 43.9$ |
| $r_{10} = -25.786$ | $d_{10} = 2.00$ | $n_6 = 1.76169$ | $\nu_6 = 27.3$ |
| $r_{11} = 74.081$ | $d_{11} = 4.62$ | | |
| $r_{12} = -81.511$ | $d_{12} = 4.50$ | $n_7 = 1.77622$ | $\nu_7 = 49.4$ |
| $r_{13} = -43.199$ | $d_{13} = 1.49$ | | |
| $r_{14} = 204.097$ | $d_{14} = 4.11$ | $n_8 = 1.79196$ | $\nu_8 = 47.1$ |
| $r_{15} = -122.218$ | $d_{15} = 35.89$ | | |
| $r_{16} = -62.109$ | $d_{16} = 2.66$ | $n_9 = 1.61075$ | $\nu_9 = 40.0$ |
| $r_{17} = 213.114$ | $d_{17} = 7.80$ | | |
| $r_{18} = 847.406$ | $d_{18} = 10.30$ | $n_{10} = 1.68083$ | $\nu_{10} = 55.1$ |
| $r_{19} = -95.951$ | $d_{19} = 0.63$ | | |
| $r_{20} = 121.641$ | $d_{20} = 10.45$ | $n_{11} = 1.77622$ | $\nu_{11} = 49.4$ |
| $r_{21} = -255.505$ | $d_{21} = 4.50$ | | |
| $r_{22} = 0.000$ | $d_{22} = 41.10$ | $n_{12} = 1.51825$ | $\nu_{12} = 63.8$ |
| $r_{23} = 0.000$ | | | |

Aspheric coefficient

First surface:
$K = 0.655275$  $AD = 0.626082 \times 10^{-7}$
$AE = -0.144786 \times 10^{-10}$  $AF = -0.109334 \times 10^{-14}$

Second surface:
$K = 0.367907 \times 10^2$

Third surface:
$K = 0.440304$  $AD = 0.126898 \times 10^{-7}$
$AE = 0.634832 \times 10^{-11}$  $AF = 0.928375 \times 10^{-14}$

Fourth surface:
$K = -0.241861 \times 10^{-1}$  $AD = 0.166124 \times 10^{-6}$
$AE = 0.434466 \times 10^{-9}$  $AF = 0.561828 \times 10^{-12}$

Third embodiment

| | | | |
|---|---|---|---|
| $f = 52.47$ | | Aperture ratio | 1:2.8 |
| Projection magnification | 17.19 | $\omega = 33.8°$ | |
| $f_{1.7}/f = 1.09$ | | $d_{15}/f = 0.64$ | |
| $d_{17}/f = 0.12$ | | $f_8/f_{9.10} = -1.31$ | |
| $r_1 = 148.519$ | $d_1 = 8.40$ | $n_1 = 1.51825$ | $\nu_1 = 63.8$ |
| $r_2 = -6939.731$ | $d_2 = 5.18$ | | |
| $r_3 = 49.137$ | $d_3 = 6.00$ | $n_2 = 1.51825$ | $\nu_2 = 63.8$ |
| $r_4 = 29.177$ | $d_4 = 9.37$ | | |
| $r_5 = 608.860$ | $d_5 = 2.21$ | $n_3 = 1.52555$ | $\nu_3 = 50.5$ |
| $r_6 = 28.525$ | $d_6 = 18.76$ | | |
| $r_7 = 74.902$ | $d_7 = 17.33$ | $n_4 = 1.85503$ | $\nu_4 = 23.7$ |
| $r_8 = -372.104$ | $d_8 = 6.68$ | | |
| $r_9 = 271.686$ | $d_9 = 17.77$ | $n_5 = 1.79013$ | $\nu_5 = 43.9$ |
| $r_{10} = -25.786$ | $d_{10} = 2.00$ | $n_6 = 1.76169$ | $\nu_6 = 27.3$ |
| $r_{11} = 74.081$ | $d_{11} = 4.62$ | | |
| $r_{12} = -81.511$ | $d_{12} = 4.50$ | $n_7 = 1.77622$ | $\nu_7 = 49.4$ |
| $r_{13} = -43.199$ | $d_{13} = 1.49$ | | |
| $r_{14} = 204.097$ | $d_{14} = 4.11$ | $n_8 = 1.79196$ | $\nu_8 = 47.1$ |
| $r_{15} = -122.218$ | $d_{15} = 33.60$ | | |
| $r_{16} = -49.674$ | $d_{16} = 2.66$ | $n_9 = 1.62059$ | $\nu_9 = 36.4$ |
| $r_{17} = 298.959$ | $d_{17} = 6.11$ | | |
| $r_{18} = -275.028$ | $d_{18} = 10.70$ | $n_{10} = 1.68083$ | $\nu_{10} = 55.1$ |
| $r_{19} = -56.037$ | $d_{19} = 0.25$ | | |
| $r_{20} = 341.327$ | $d_{20} = 11.05$ | $n_{11} = 1.77622$ | $\nu_{11} = 49.4$ |
| $r_{21} = -103.830$ | $d_{21} = 6.70$ | | |
| $r_{22} = 0.000$ | $d_{22} = 43.30$ | $n_{12} = 1.51825$ | $\nu_{12} = 63.8$ |
| $r_{23} = 0.000$ | | | |

Aspheric coefficient

First surface:
$K = -0.2749912 \times 10^{-1}$  $AD = 0.2548179 \times 10^{-7}$
$AE = -0.2056712 \times 10^{-10}$  $AF = -0.4319405 \times 10^{-14}$
$AG = 0.8811238 \times 10^{-18}$

Fourth surface:
$K = 0.3668809 \times 10^{-1}$  $AD = 0.1536691 \times 10^{-6}$
$AE = -0.1142634 \times 10^{-10}$  $AF = 0.8573753 \times 10^{-12}$
$AG = 0.2158643 \times 10^{-15}$

Seventeenth surface:
$K = 0.2637872 \times 10^2$  $AD = 0.1858271 \times 10^{-6}$
$AE = 0.1334531 \times 10^{-10}$  $AF = 0.2612238 \times 10^{-13}$
$AG = 0.9178511 \times 10^{-17}$

Eighteenth surface:
$K = 0.5903051 \times 10^1$  $AD = -0.2472130 \times 10^{-6}$
$AE = 0.1460313 \times 10^{-9}$  $AF = 0.3400976 \times 10^{-13}$
$AG = 0.3706282 \times 10^{-17}$

Twentieth surface:
$K = -0.9201606$  $AD = -0.1022347 \times 10^{-6}$
$AE = 0.7465995 \times 10^{-10}$  $AF = 0.1567219 \times 10^{-13}$
$AG = 0.1032802 \times 10^{-17}$

Fourth embodiment

| | | | |
|---|---|---|---|
| $f = 49.94$ | | Aperture ratio | 1:2.8 |
| Projection magnification | 18.09 | $\omega = 34.1°$ | |
| $f_{1.7}/f = 1.14$ | | $d_{15}/f = 0.67$ | |
| $d_{17}/f = 0.12$ | | $f_8/f_{9.10} = -1.37$ | |
| $r_1 = 146.163$ | $d_1 = 8.40$ | $n_1 = 1.51825$ | $\nu_1 = 63.8$ |
| $r_2 = 0.000$ | $d_2 = 5.18$ | | |
| $r_3 = 49.670$ | $d_3 = 6.00$ | $n_2 = 1.51825$ | $\nu_2 = 63.8$ |
| $r_4 = 29.101$ | $d_4 = 9.39$ | | |
| $r_5 = 937.536$ | $d_5 = 2.21$ | $n_3 = 1.52555$ | $\nu_3 = 50.5$ |
| $r_6 = 28.141$ | $d_6 = 18.76$ | | |
| $r_7 = 74.902$ | $d_7 = 17.33$ | $n_4 = 1.85503$ | $\nu_4 = 23.7$ |
| $r_8 = -372.104$ | $d_8 = 6.68$ | | |
| $r_9 = 271.686$ | $d_9 = 17.77$ | $n_5 = 1.79013$ | $\nu_5 = 43.9$ |
| $r_{10} = -25.786$ | $d_{10} = 2.00$ | $n_6 = 1.76169$ | $\nu_6 = 27.3$ |
| $r_{11} = 74.081$ | $d_{11} = 4.62$ | | |
| $r_{12} = -81.511$ | $d_{12} = 4.50$ | $n_7 = 1.77622$ | $\nu_7 = 49.4$ |
| $r_{13} = -43.199$ | $d_{13} = 1.49$ | | |
| $r_{14} = 204.097$ | $d_{14} = 4.11$ | $n_8 = 1.79196$ | $\nu_8 = 47.1$ |
| $r_{15} = -122.218$ | $d_{15} = 33.60$ | | |
| $r_{16} = -49.674$ | $d_{16} = 2.66$ | $n_9 = 1.62059$ | $\nu_9 = 36.4$ |
| $r_{17} = 303.305$ | $d_{17} = 6.11$ | | |
| $r_{18} = -310.381$ | $d_{18} = 10.70$ | $n_{10} = 1.68083$ | $\nu_{10} = 55.1$ |
| $r_{19} = -54.486$ | $d_{19} = 0.25$ | | |
| $r_{20} = 275.356$ | $d_{20} = 11.05$ | $n_{11} = 1.77622$ | $\nu_{11} = 49.4$ |
| $r_{21} = -108.456$ | $d_{21} = 6.70$ | | |
| $r_{22} = 0.000$ | $d_{22} = 43.30$ | $n_{12} = 1.51825$ | $\nu_{12} = 63.8$ |
| $r_{23} = 0.000$ | | | |

Aspheric coefficient

First surface:

-continued

| | |
|---|---|
| $K = -0.2301050 \times 10^{-1}$ | $AD = 0.2511178 \times 10^{-7}$ |
| $AE = -0.1943356 \times 10^{-10}$ | $AF = -0.3619595 \times 10^{-14}$ |
| $AG = 0.8095271 \times 10^{-18}$ | |

Fourth surface:

| | |
|---|---|
| $K = 0.3295092 \times 10^{-1}$ | $AD = -0.4594244 \times 10^{-7}$ |
| $AE = 0.7461787 \times 10^{-10}$ | $AF = 0.4135199 \times 10^{-12}$ |
| $AG = -0.3071122 \times 10^{-15}$ | |

Seventeenth surface:

| | |
|---|---|
| $K = 0.2504243 \times 10^{2}$ | $AD = 0.1782731 \times 10^{-6}$ |
| $AE = -0.1529465 \times 10^{-11}$ | $AF = 0.2164382 \times 10^{-13}$ |
| $AG = -0.7725707 \times 10^{-17}$ | |

Eighteenth surface:

| | |
|---|---|
| $K = 0.1032711 \times 10^{2}$ | $AD = -0.2772488 \times 10^{-6}$ |
| $AE = 0.1544648 \times 10^{-9}$ | $AF = 0.2193979 \times 10^{-13}$ |
| $AG = -0.1042978 \times 10^{-16}$ | |

Twentieth surface:

| | |
|---|---|
| $K = -0.5525461 \times 10^{1}$ | $AD = -0.1231838 \times 10^{-6}$ |
| $AE = 0.8516421 \times 10^{-10}$ | $AF = 0.1510178 \times 10^{-13}$ |
| $AG = 0.1229936 \times 10^{-18}$ | |

Fifth embodiment

| | |
|---|---|
| $f = 50.00$ | Aperture ratio 1:2.8 |
| Projection magnification 18.10 | $\omega = 34.0°$ |
| $f_{1,7}/f = 1.14$ | $d_{15}/f = 0.67$ |
| $d_{17}/f = 0.12$ | $f_8/f_{9,10} = -1.35$ |

| | | | |
|---|---|---|---|
| $r_1 = 139.093$ | $d_1 = 8.40$ | $n_1 = 1.51825$ | $\nu_1 = 63.8$ |
| $r_2 = 1883.809$ | $d_2 = 5.18$ | | |
| $r_3 = 44.322$ | $d_3 = 6.00$ | $n_2 = 1.51825$ | $\nu_2 = 63.8$ |
| $r_4 = 26.610$ | $d_4 = 11.06$ | | |
| $r_5 = 1031.968$ | $d_5 = 2.21$ | $n_3 = 1.52555$ | $\nu_3 = 50.5$ |
| $r_6 = 28.804$ | $d_6 = 18.76$ | | |
| $r_7 = 74.902$ | $d_7 = 17.33$ | $n_4 = 1.85503$ | $\nu_4 = 23.7$ |
| $r_8 = -372.104$ | $d_8 = 6.68$ | | |
| $r_9 = 271.686$ | $d_9 = 17.77$ | $n_5 = 1.79013$ | $\nu_5 = 43.9$ |
| $r_{10} = -25.786$ | $d_{10} = 2.00$ | $n_6 = 1.76169$ | $\nu_6 = 27.3$ |
| $r_{11} = 74.081$ | $d_{11} = 4.62$ | | |
| $r_{12} = -81.511$ | $d_{12} = 4.50$ | $n_7 = 1.77622$ | $\nu_7 = 49.4$ |
| $r_{13} = -43.199$ | $d_{13} = 1.49$ | | |
| $r_{14} = 204.097$ | $d_{14} = 4.11$ | $n_8 = 1.79196$ | $\nu_8 = 47.1$ |
| $r_{15} = -122.218$ | $d_{15} = 33.60$ | | |
| $r_{16} = -48.652$ | $d_{16} = 2.66$ | $n_9 = 1.62059$ | $\nu_9 = 36.4$ |
| $r_{17} = 293.965$ | $d_{17} = 6.11$ | | |
| $r_{18} = -406.452$ | $d_{18} = 10.70$ | $n_{10} = 1.68083$ | $\nu_{10} = 55.1$ |
| $r_{19} = -56.325$ | $d_{19} = 0.25$ | | |
| $r_{20} = 243.391$ | $d_{20} = 11.05$ | $n_{11} = 1.77622$ | $\nu_{11} = 49.4$ |
| $r_{21} = -112.964$ | $d_{21} = 6.70$ | | |
| $r_{22} = 0.000$ | $d_{22} = 43.30$ | $n_{12} = 1.51825$ | $\nu_{12} = 63.8$ |
| $r_{23} = 0.000$ | | | |

Aspheric coefficient

First surface:

| | |
|---|---|
| $K = 0.3664325$ | $AD = 0.4574458 \times 10^{-7}$ |
| $AE = -0.3507965 \times 10^{-10}$ | $AF = 0.2388062 \times 10^{-14}$ |
| $AG = 0.2247566 \times 10^{-19}$ | |

Seventeenth surface:

| | |
|---|---|
| $K = 0.1229070 \times 10^{2}$ | $AD = 0.9272514 \times 10^{-7}$ |
| $AE = -0.3770400 \times 10^{-10}$ | $AF = 0.1428259 \times 10^{-12}$ |
| $AG = 0.5601794 \times 10^{-16}$ | |

Eighteenth surface:

| | |
|---|---|
| $K = 0.2118076 \times 10^{2}$ | $AD = -0.4127061 \times 10^{-6}$ |
| $AE = 0.2205876 \times 10^{-9}$ | $AF = 0.6059036 \times 10^{-13}$ |
| $AG = 0.6235547 \times 10^{-16}$ | |

Sixth embodiment

| | |
|---|---|
| $f = 50.15$ | Aperture ratio 1:2.8 |
| Projection magnification 18.09 | $\omega = 34.1°$ |
| $f_{1,7}/f = 1.15$ | $d_{15}/f = 0.67$ |
| $d_{17}/f = 0.12$ | $f_8/f_{9,10} = -1.33$ |

| | | | |
|---|---|---|---|
| $r_1 = 138.102$ | $d_1 = 8.40$ | $n_1 = 1.51825$ | $\nu_1 = 63.8$ |
| $r_2 = 3278.162$ | $d_2 = 5.18$ | | |
| $r_3 = 48.685$ | $d_3 = 6.00$ | $n_2 = 1.51825$ | $\nu_2 = 63.8$ |
| $r_4 = 29.654$ | $d_4 = 11.06$ | | |
| $r_5 = 1869.065$ | $d_5 = 2.21$ | $n_3 = 1.52555$ | $\nu_3 = 50.5$ |
| $r_6 = 27.929$ | $d_6 = 18.76$ | | |
| $r_7 = 74.902$ | $d_7 = 17.33$ | $n_4 = 1.85503$ | $\nu_4 = 23.7$ |
| $r_8 = -372.104$ | $d_8 = 6.68$ | | |
| $r_9 = 271.686$ | $d_9 = 17.77$ | $n_5 = 1.79013$ | $\nu_5 = 43.9$ |
| $r_{10} = -25.786$ | $d_{10} = 2.00$ | $n_6 = 1.76169$ | $\nu_6 = 27.3$ |
| $r_{11} = 74.081$ | $d_{11} = 4.62$ | | |
| $r_{12} = -81.511$ | $d_{12} = 4.50$ | $n_7 = 1.77622$ | $\nu_7 = 49.4$ |
| $r_{13} = -43.199$ | $d_{13} = 1.49$ | | |
| $r_{14} = 204.097$ | $d_{14} = 4.11$ | $n_8 = 1.79196$ | $\nu_8 = 47.1$ |
| $r_{15} = -122.218$ | $d_{15} = 33.60$ | | |
| $r_{16} = -45.791$ | $d_{16} = 2.66$ | $n_9 = 1.62059$ | $\nu_9 = 36.4$ |
| $r_{17} = 288.771$ | $d_{17} = 6.11$ | | |
| $r_{18} = -339.448$ | $d_{18} = 11.20$ | $n_{10} = 1.68083$ | $\nu_{10} = 55.1$ |
| $r_{19} = -52.879$ | $d_{19} = 0.25$ | | |
| $r_{20} = 237.092$ | $d_{20} = 11.05$ | $n_{11} = 1.77622$ | $\nu_{11} = 49.4$ |
| $r_{21} = -107.581$ | $d_{21} = 6.70$ | | |
| $r_{22} = 0.000$ | $d_{22} = 43.30$ | $n_{12} = 1.51825$ | $\nu_{12} = 63.8$ |
| $r_{23} = 0.000$ | | | |

Aspheric coefficient

First surface:

| | |
|---|---|
| $K = -0.8676696$ | $AD = 0.4922937 \times 10^{-7}$ |
| $AE = -0.2681624 \times 10^{-10}$ | $AF = 0.4039305 \times 10^{-14}$ |
| $AG = -0.6315714 \times 10^{-18}$ | |

Seventeenth surface:

| | |
|---|---|
| $K = 0.1204351 \times 10^{2}$ | $AD = 0.8134826 \times 10^{-7}$ |
| $AE = 0.3285905 \times 10^{-11}$ | $AF = -0.3382158 \times 10^{-13}$ |
| $AG = 0.1685514 \times 10^{-16}$ | |

Twentieth surface:

| | |
|---|---|
| $K = -0.1760054 \times 10^{2}$ | $AD = -0.2229407 \times 10^{-6}$ |
| $AE = 0.8474120 \times 10^{-10}$ | $AF = 0.3501296 \times 10^{-13}$ |
| $AG = -0.6162020 \times 10^{-17}$ | |

Seventh embodiment

| | |
|---|---|
| $f = 49.98$ | Aperture ratio 1:2.8 |
| Projection magnification 18.09 | $\omega = 34.2°$ |
| $f_{1,7}/f = 1.16$ | $d_{15}/f = 0.67$ |
| $d_{17}/f = 0.12$ | $f_8/f_{9,10} = -1.35$ |

| | | | |
|---|---|---|---|
| $r_1 = 97.304$ | $d_1 = 8.40$ | $n_1 = 1.51825$ | $\nu_1 = 63.8$ |
| $r_2 = 419.135$ | $d_2 = 5.18$ | | |
| $r_3 = 71.654$ | $d_3 = 6.00$ | $n_2 = 1.51825$ | $\nu_2 = 63.8$ |
| $r_4 = 34.797$ | $d_4 = 7.04$ | | |
| $r_5 = 373.100$ | $d_5 = 2.21$ | $n_3 = 1.52555$ | $\nu_3 = 50.5$ |
| $r_6 = 27.138$ | $d_6 = 18.76$ | | |
| $r_7 = 74.902$ | $d_7 = 17.33$ | $n_4 = 1.85503$ | $\nu_4 = 23.7$ |
| $r_8 = -372.104$ | $d_8 = 6.68$ | | |
| $r_9 = 271.686$ | $d_9 = 17.77$ | $n_5 = 1.79013$ | $\nu_5 = 43.9$ |
| $r_{10} = -25.786$ | $d_{10} = 2.00$ | $n_6 = 1.76169$ | $\nu_6 = 27.3$ |
| $r_{11} = 74.081$ | $d_{11} = 4.62$ | | |
| $r_{12} = -81.511$ | $d_{12} = 4.50$ | $n_7 = 1.77622$ | $\nu_7 = 49.4$ |
| $r_{13} = -43.199$ | $d_{13} = 1.49$ | | |
| $r_{14} = 204.097$ | $d_{14} = 4.11$ | $n_8 = 1.79196$ | $\nu_8 = 47.1$ |
| $r_{15} = -122.218$ | $d_{15} = 33.60$ | | |
| $r_{16} = -47.158$ | $d_{16} = 2.66$ | $n_9 = 1.62059$ | $\nu_9 = 36.4$ |
| $r_{17} = 234.453$ | $d_{17} = 6.11$ | | |
| $r_{18} = -282.754$ | $d_{18} = 10.70$ | $n_{10} = 1.68083$ | $\nu_{10} = 55.1$ |
| $r_{19} = -50.375$ | $d_{19} = 0.25$ | | |
| $r_{20} = 387.424$ | $d_{20} = 11.05$ | $n_{11} = 1.77622$ | $\nu_{11} = 49.4$ |
| $r_{21} = -89.653$ | $d_{21} = 6.70$ | | |
| $r_{22} = 0.000$ | $d_{22} = 43.30$ | $n_{12} = 1.51825$ | $\nu_{12} = 63.8$ |
| $r_{23} = 0.000$ | | | |

Aspheric coefficient

Seventeenth surface:

| | |
|---|---|
| $K = 0.3064228 \times 10^{2}$ | $AD = 0.3424168 \times 10^{-6}$ |
| $AE = 0.1524318 \times 10^{-11}$ | $AF = 0.2578158 \times 10^{-14}$ |
| $AG = -0.1657459 \times 10^{-16}$ | |

Eighteenth surface:

| | |
|---|---|
| $K = -0.1540423 \times 10^{2}$ | $AD = -0.1423166 \times 10^{-6}$ |
| $AE = 0.2421751 \times 10^{-9}$ | $AF = 0.9010286 \times 10^{-13}$ |
| $AG = 0.6174771 \times 10^{-16}$ | |

Twentieth surface:

K = −0.1023903 × 10³   AD = −0.2301108 × 10⁻⁶
AE = 0.1076672 × 10⁻⁹   AF = −0.1514403 × 10⁻¹⁴
AG = −0.3385086 × 10⁻¹⁷

Eighth embodiment f = 50.09    Aperture 1:2.8 ratio
Projection magnification 18.09    ω = 34.1°
$f_{1.7}/f = 1.13$    $d_{15}/f = 0.67$
$d_{17}/f = 0.12$    $f_8/f_{9.10} = -1.34$

| | | | | | |
|---|---|---|---|---|---|
| $r_1 =$ | 100.392 | $d_1 =$ 8.40 | $n_1 = 1.51825$ | $\nu_1 = 63.8$ | |
| $r_2 =$ | 203.275 | $d_2 =$ 5.18 | | | |
| $r_3 =$ | 39.627 | $d_3 =$ 6.00 | $n_2 = 1.51825$ | $\nu_2 = 63.8$ | |
| $r_4 =$ | 24.889 | $d_4 =$ 12.47 | | | |
| $r_5 =$ | 566.809 | $d_5 =$ 2.21 | $n_3 = 1.52555$ | $\nu_3 = 50.5$ | |
| $r_6 =$ | 29.209 | $d_6 =$ 18.76 | | | |
| $r_7 =$ | 74.902 | $d_7 =$ 17.33 | $n_4 = 1.85503$ | $\nu_4 = 23.7$ | |
| $r_8 =$ | −372.104 | $d_8 =$ 6.68 | | | |
| $r_9 =$ | 271.686 | $d_9 =$ 17.77 | $n_5 = 1.79013$ | $\nu_5 = 43.9$ | |
| $r_{10} =$ | −25.786 | $d_{10} =$ 2.00 | $n_6 = 1.76169$ | $\nu_6 = 27.3$ | |
| $r_{11} =$ | 74.081 | $d_{11} =$ 4.62 | | | |
| $r_{12} =$ | −81.511 | $d_{12} =$ 4.50 | $n_7 = 1.77622$ | $\nu_7 = 49.4$ | |
| $r_{13} =$ | −43.199 | $d_{13} =$ 1.49 | | | |
| $r_{14} =$ | 204.097 | $d_{14} =$ 4.11 | $n_8 = 1.79196$ | $\nu_8 = 47.1$ | |
| $r_{15} =$ | −122.218 | $d_{15} =$ 35.89 | | | |
| $r_{16} =$ | −49.808 | $d_{16} =$ 2.66 | $n_9 = 1.62059$ | $\nu_9 = 36.4$ | |
| $r_{17} =$ | 275.553 | $d_{17} =$ 6.11 | | | |
| $r_{18} =$ | −519.026 | $d_{18} =$ 10.70 | $n_{10} = 1.68083$ | $\nu_{10} = 55.1$ | |
| $r_{19} =$ | −60.159 | $d_{19} =$ 0.25 | | | |
| $r_{20} =$ | 250.814 | $d_{20} =$ 11.05 | $n_{11} = 1.77622$ | $\nu_{11} = 49.4$ | |
| $r_{21} =$ | −108.683 | $d_{21} =$ 6.70 | | | |
| $r_{22} =$ | 0.000 | $d_{22} =$ 43.30 | $n_{12} = 1.51825$ | $\nu_{12} = 63.8$ | |
| $r_{23} =$ | 0.000 | | | | |

Aspheric coefficient

First surface:

K = 0.9525501    AD = 0.2216984 × 10⁻⁶
AE = −0.4500812 × 10⁻¹⁰    AF = 0.1270679 × 10⁻¹³
AG = −0.2481052 × 10⁻¹⁷

Seventeenth surface:

K = 0.3154613 × 10²    AD = 0.5889586 × 10⁻⁶
AE = −0.5654111 × 10⁻⁹    AF = 0.5498361 × 10⁻¹³
AG = 0.2775640 × 10⁻¹⁶

Ninth embodiment f = 49.91    Aperture 1:2.8 ratio
Projection magnification 18.07    ω = 34.2°
$f_{1.7}/f = 1.13$    $d_{15}/f = 0.67$
$d_{17}/f = 0.12$    $f_8/f_{9.10} = -1.39$

| | | | | | |
|---|---|---|---|---|---|
| $r_1 =$ | 92.116 | $d_1 =$ 8.40 | $n_1 = 1.51825$ | $\nu_1 = 63.8$ | |
| $r_2 =$ | 256.167 | $d_2 =$ 5.18 | | | |
| $r_3 =$ | 60.670 | $d_3 =$ 6.00 | $n_2 = 1.51825$ | $\nu_2 = 63.8$ | |
| $r_4 =$ | 29.056 | $d_4 =$ 8.80 | | | |
| $r_5 =$ | 222.628 | $d_5 =$ 2.21 | $n_3 = 1.52555$ | $\nu_3 = 50.5$ | |
| $r_6 =$ | 28.187 | $d_6 =$ 18.76 | | | |
| $r_7 =$ | 74.902 | $d_7 =$ 17.33 | $n_4 = 1.85503$ | $\nu_4 = 23.7$ | |
| $r_8 =$ | −372.104 | $d_8 =$ 6.68 | | | |
| $r_9 =$ | 271.686 | $d_9 =$ 17.77 | $n_5 = 1.79013$ | $\nu_5 = 43.9$ | |
| $r_{10} =$ | −25.786 | $d_{10} =$ 2.00 | $n_6 = 1.76169$ | $\nu_6 = 27.3$ | |
| $r_{11} =$ | 74.081 | $d_{11} =$ 4.62 | | | |
| $r_{12} =$ | −81.511 | $d_{12} =$ 4.50 | $n_7 = 1.77622$ | $\nu_7 = 49.4$ | |
| $r_{13} =$ | −43.199 | $d_{13} =$ 1.49 | | | |
| $r_{14} =$ | 204.097 | $d_{14} =$ 4.11 | $n_8 = 1.79196$ | $\nu_8 = 47.1$ | |
| $r_{15} =$ | −122.218 | $d_{15} =$ 35.89 | | | |
| $r_{16} =$ | −55.629 | $d_{16} =$ 2.66 | $n_9 = 1.62059$ | $\nu_9 = 36.4$ | |
| $r_{17} =$ | 243.662 | $d_{17} =$ 6.11 | | | |
| $r_{18} =$ | −319.338 | $d_{18} =$ 10.70 | $n_{10} = 1.68083$ | $\nu_{10} = 55.1$ | |
| $r_{19} =$ | −61.756 | $d_{19} =$ 0.25 | | | |
| $r_{20} =$ | 302.607 | $d_{20} =$ 11.05 | $n_{11} = 1.77622$ | $\nu_{11} = 49.4$ | |
| $r_{21} =$ | −96.776 | $d_{21} =$ 6.70 | | | |
| $r_{22} =$ | 0.000 | $d_{22} =$ 43.30 | $n_{12} = 1.51825$ | $\nu_{12} = 63.8$ | |
| $r_{23} =$ | 0.000 | | | | |

Aspheric coefficient

First surface:

K = 0.3399632    AD = 0.7523389 × 10⁻⁷
AE = −0.6005325 × 10⁻¹⁰    AF = 0.2647887 × 10⁻¹³
AG = −0.5935675 × 10⁻¹⁷

Eighteenth surface:

K = 0.2756654 × 10²    AD = −0.7554289 × 10⁻⁶
AE = 0.3478933 × 10⁻⁹    AF = −0.7082334 × 10⁻¹³
AG = 0.2544740 × 10⁻¹⁶

Tenth embodiment f = 50.04    Aperture 1:2.8 ratio
Projection magnification 18.10    ω = 34.2°
$f_{1.7}/f = 1.14$    $d_{15}/f = 0.67$
$d_{17}/f = 0.12$    $f_8/f_{1.10} = -1.31$

| | | | | | |
|---|---|---|---|---|---|
| $r_1 =$ | 114.457 | $d_1 =$ 8.40 | $n_1 = 1.51825$ | $\nu_1 = 63.8$ | |
| $r_2 =$ | 483.920 | $d_2 =$ 5.18 | | | |
| $r_3 =$ | 48.101 | $d_3 =$ 6.00 | $n_2 = 1.51825$ | $\nu_2 = 63.8$ | |
| $r_4 =$ | 28.146 | $d_4 =$ 9.91 | | | |
| $r_5 =$ | 575.308 | $d_5 =$ 2.21 | $n_3 = 1.52555$ | $\nu_3 = 50.5$ | |
| $r_6 =$ | 28.386 | $d_6 =$ 18.76 | | | |
| $r_7 =$ | 74.902 | $d_7 =$ 17.33 | $n_4 = 1.85503$ | $\nu_4 = 23.7$ | |
| $r_8 =$ | −372.104 | $d_8 =$ 6.68 | | | |
| $r_9 =$ | 271.686 | $d_9 =$ 17.77 | $n_5 = 1.79013$ | $\nu_5 = 43.9$ | |
| $r_{10} =$ | −25.786 | $d_{10} =$ 2.00 | $n_6 = 1.76169$ | $\nu_6 = 27.3$ | |
| $r_{11} =$ | 74.081 | $d_{11} =$ 4.62 | | | |
| $r_{12} =$ | −81.511 | $d_{12} =$ 4.50 | $n_7 = 1.77622$ | $\nu_7 = 49.4$ | |
| $r_{13} =$ | −43.199 | $d_{13} =$ 1.49 | | | |
| $r_{14} =$ | 204.097 | $d_{14} =$ 4.11 | $n_8 = 1.79196$ | $\nu_8 = 47.1$ | |
| $r_{15} =$ | −122.218 | $d_{15} =$ 33.60 | | | |
| $r_{16} =$ | −46.081 | $d_{16} =$ 2.66 | $n_9 = 1.62059$ | $\nu_9 = 36.4$ | |
| $r_{17} =$ | 228.576 | $d_{17} =$ 6.11 | | | |
| $r_{18} =$ | −509.475 | $d_{18} =$ 10.70 | $n_{10} = 1.68083$ | $\nu_{10} = 55.1$ | |
| $r_{19} =$ | −54.905 | $d_{19} =$ 0.25 | | | |
| $r_{20} =$ | 238.750 | $d_{20} =$ 11.05 | $n_{11} = 1.77622$ | $\nu_{11} = 49.4$ | |

-continued

| | | | |
|---|---|---|---|
| $r_{21} =$ | −103.160 | $d_{21}$ | 6.70 |
| $r_{22} =$ | 0.000 | $d_{22}$ | 43.30  $n_{12} = 1.51825$  $\nu_{12} = 63.8$ |
| $r_{23} =$ | 0.000 | | |

Aspheric coefficient

Figure 2A:
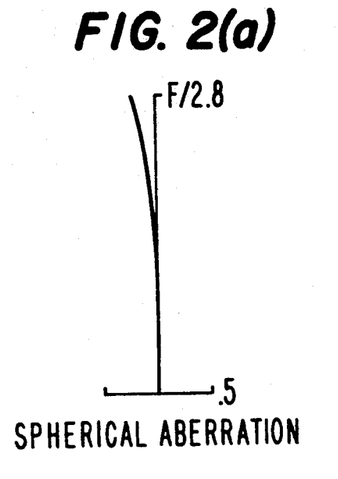
Figure 2B:
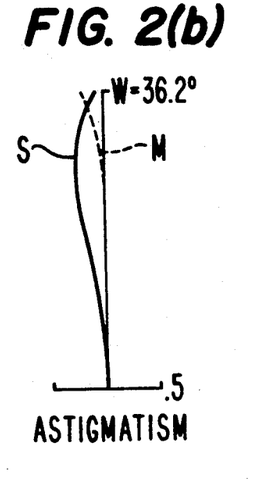
Figure 2C:
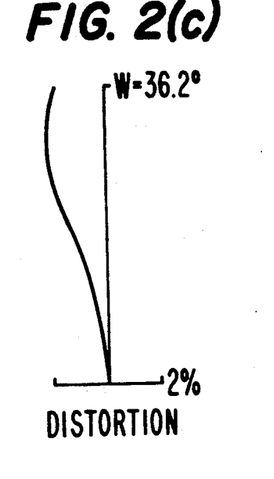
Figure 3A:
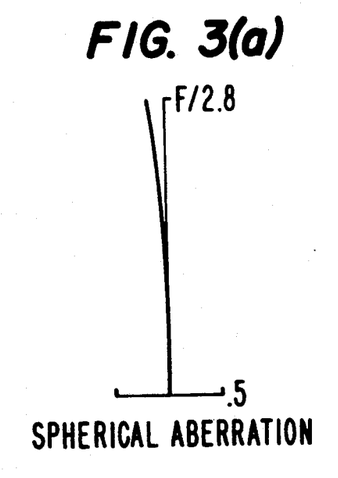
Figure 3B:
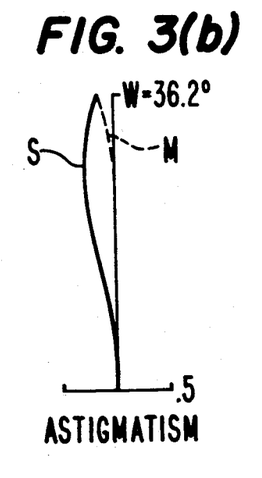
Figure 3C:
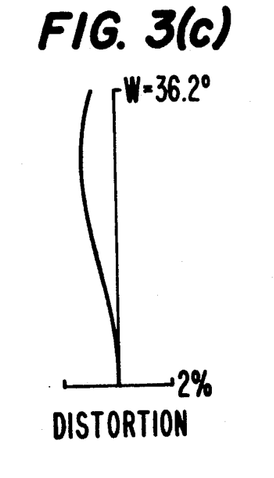
Figure 4A:
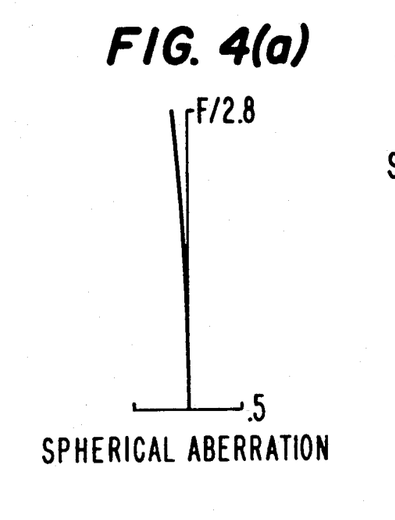
Figure 4B:
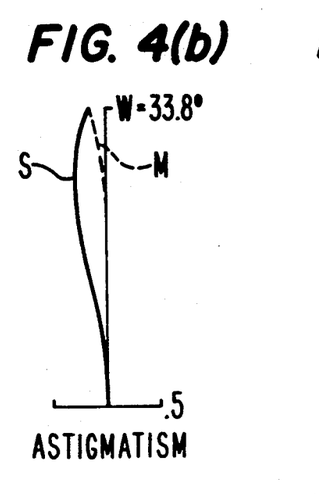
Figure 4C:
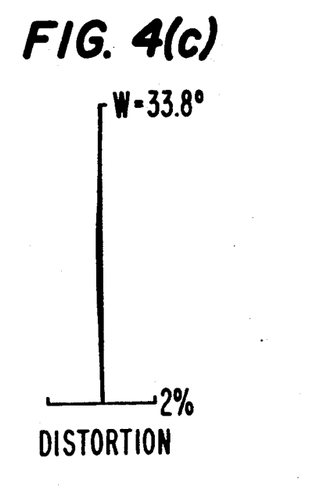
Figure 5A:
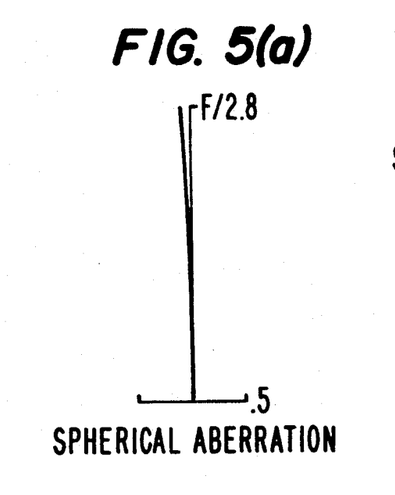
Figure 5B:
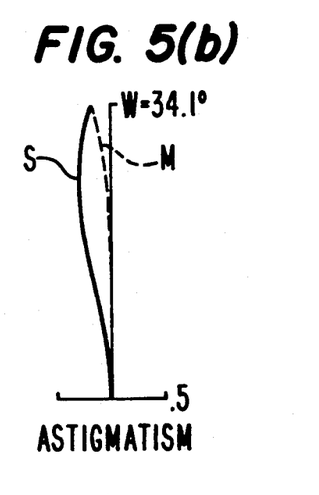
Figure 5C:
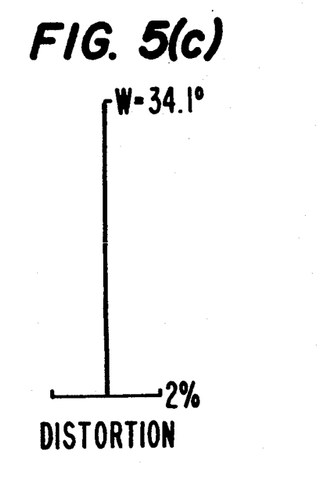
Figure 6A:
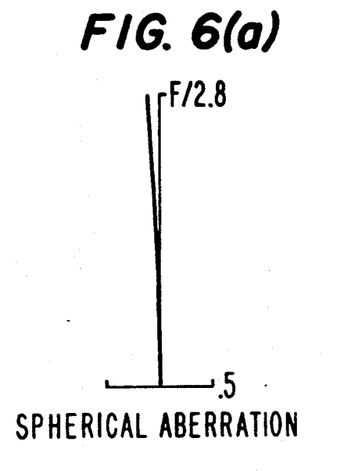
Figure 6B:
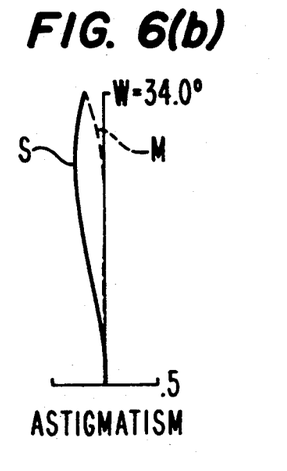
Figure 6C:
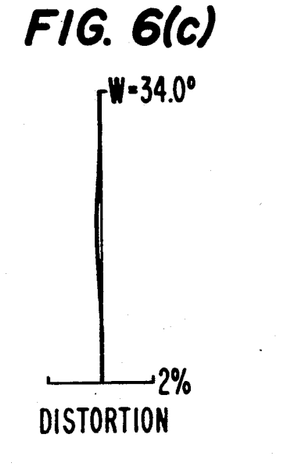
Figure 7A:
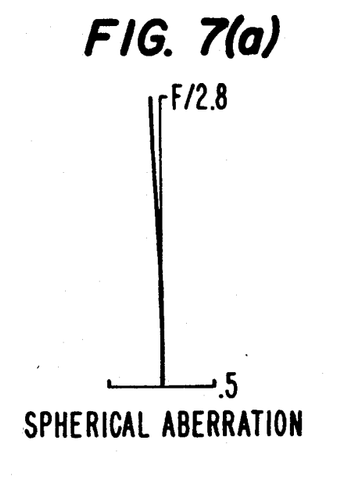
Figure 7B:
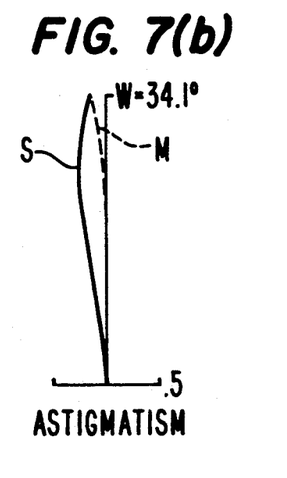
Figure 7C:
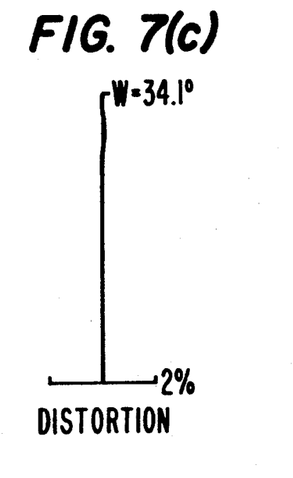
Figure 8A:
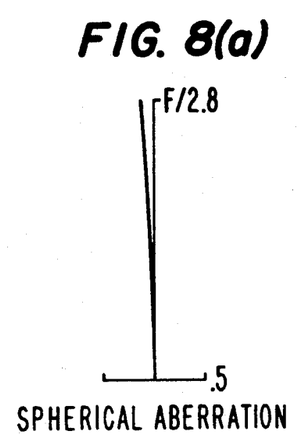
Figure 8B:
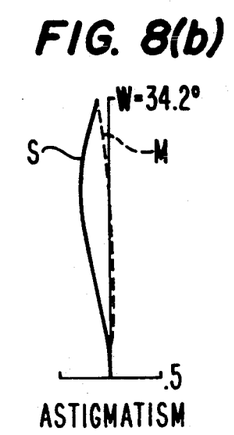
Figure 8C:
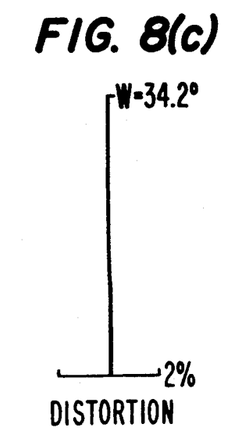
Figure 9A:
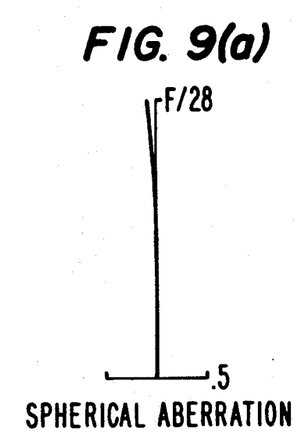
Figure 9B:
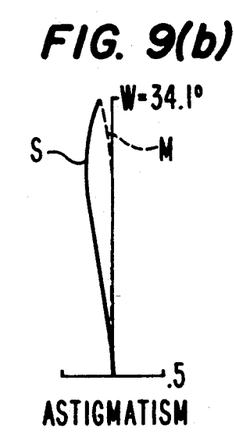
Figure 9C:
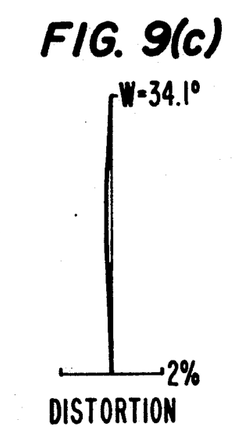
Figure 10A:
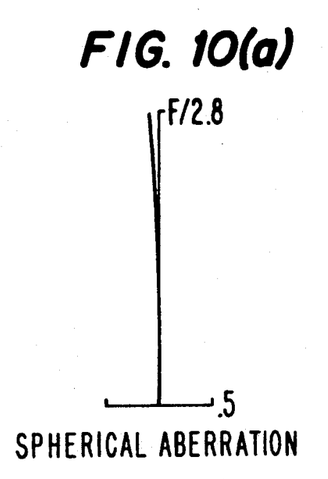
Figure 10B:
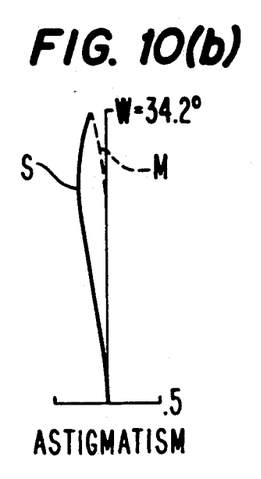
Figure 10C:
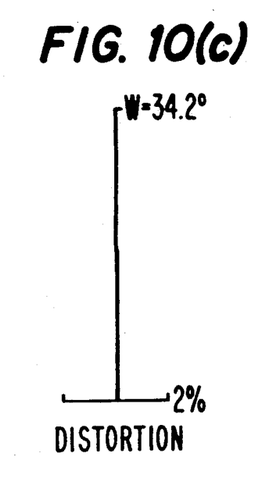
Figure 11A:
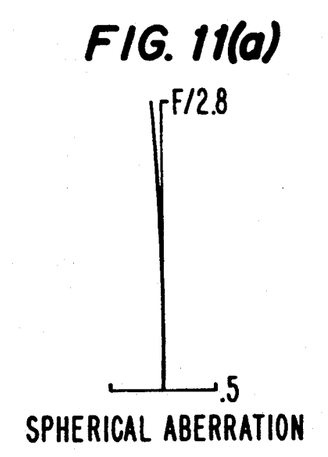
Figure 11B:
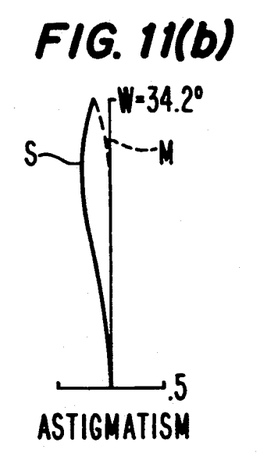
Figure 11C:
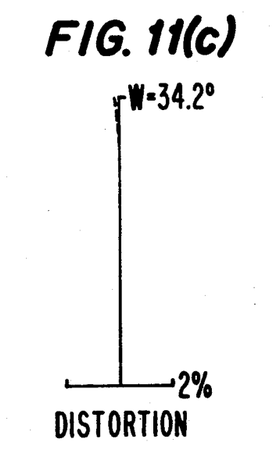

First surface:
$K = 0.7070278$           $AD = 0.1345127 \times 10^{-7}$
$AE = -0.3754727 \times 10^{-10}$   $AF = 0.6046046 \times 10^{-14}$
$AG = -0.1657469 \times 10^{-17}$ Twentieth surface:
$K = -0.1850460 \times 10^2$         $AD = -0.2560358 \times 10^{-6}$
$AE = 0.6946116 \times 10^{-10}$    $AF = 0.3196880 \times 10^{-13}$
$AG = -0.5231959 \times 10^{-17}$ In the above embodiment, the radius of curvature values 0.000 represent flat surfaces. FIGS. 2 (a), (b), (c) to 11 (a), (b), (c) are characteristic graphs of the spheric aberrations, astigmatism aberrations, and distortion aberrations of the first to tenth embodiments. As is obvious from the characteristic graphs, each aberration is fairly compensated, and the high quality characteristics of images are realized.

In each of the above embodiments, the reflection type liquid crystal element is used as the image display element. However, the present invention is not to limited to the reflection type liquid crystal element, and can be replaced, as described earlier, by the image display devices, which form images as changed of transmittance and reflectivity by means of electric signals making use of birefringence and rotatory polarization characteristics electro optical crystal, PLZT, and so on.

Figure 12:
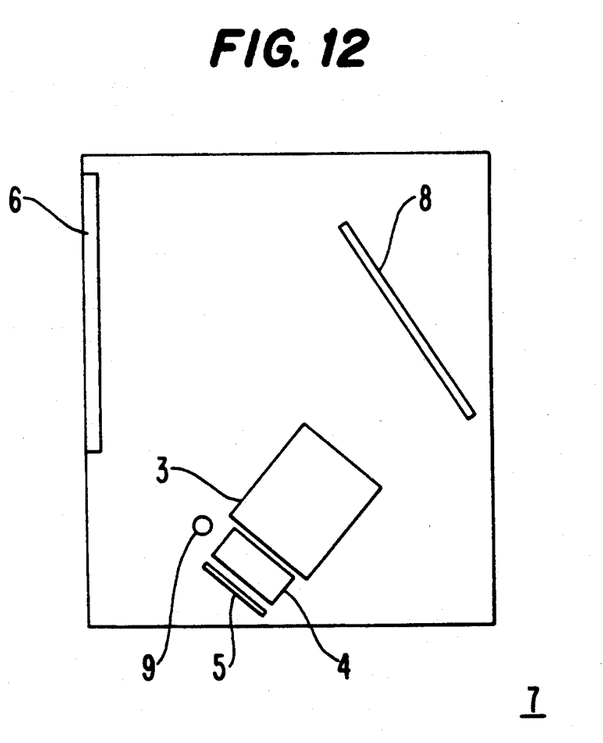
FIG. 12 is a diagram of a transmission type projection television set using a light source, a reflection type liquid crystal element as an image display element having angle-of-view dependency, and a projection lens having telecentric characteristics.

FIG. 12 is a schematic view of the transmission type projection television system using the light source 9, the reflection type liquid crystal element 5 as the image display device having the angle-of-view dependency, and the projection lens 3, which has the telecentric characteristics, of the present invention. A bundle of image rays is magnified and projected on the screen 6 through the polarizing beam splitter 4 by means of the projection lens 3 of the present invention. A mirror 8 is used for bending route of the projection light for the purpose of minimizing the size of the housing of the transmission type projection television system. The reflection type liquid crystal display element itself is smaller than the conventional CRT devices forming images, and the projection lens has the high quality characteristics of images and the characteristics of wide field angle, so that the unique transmission type projection television having both the high quality characteristics of images and the minimized size can be realized.

What is claimed is:

1. A projection lens for projecting on a screen a transmission or reflection light from an image display device which forms from a light emitted from a light source an image as changes of transmittance or reflectivity in response to an electric signal applied thereto, said projection lens comprising an inverted telephoto type front lens group at a screen side and rear lens group having a front focal point nearby an exit pupil of said front lens group, and having telecentric characteristics, wherein the front lens group includes seven lenses, and the rear lens group includes three lenses, and wherein said projection lens meets the following condition:

$$0.8 < f_{1,7}/f < 1.4$$

where
$f_{1,7}$: a total focal length of the front lens group, namely the first to seventh lenses
$f$: a total focal length of the entire system.

2. A projection lens for projecting on a screen a transmission or reflection light from an image display device which forms form a light emitted from a light source an image as changes of transmittance or reflectivity in response to an electric signal applied thereto, said projection lens comprising an inverted telephoto type front lens group at a screen side and a rear lens group having a front focal point nearby an exit pupil of said front lens group, and having telecentric characteristics, wherein the front lens group includes seven lenses, and the rear lens group includes three lenses, and wherein starting from the screen side, a first lens is a positive lens, a second lens is a negative meniscus lens having its convex surface facing the screen side, a third lens is a negative meniscus lens having its convex surface facing the screen side, a fourth lens is a bi-convex lens, a fifth lens is a negative meniscus lens including a cemented surface and having its convex surface facing the screen side, a sixth lens is a positive meniscus lens having its concave surface facing the screen side, a seventh lens is a bi-convex lens, an eighth lens is a bi-concave lens, a ninth lens is a positive lens, and a tenth lens is a bi-convex lens.

3. A projection lens according to claim 1 meeting the following conditions:

$$0.5 < k_{15}/f < 0.9$$

when a distance between surfaces of the front and rear lens groups is given as $d_{15}$, and a total focal length of the entire system is given as f.

4. A projection lens according to claim 2 meeting the following conditions:

$$d_{17}/f < 0.3$$

$$-1.5 < f_8/f_{9,10} < -1.2$$

when it is given that a distance between surfaces of the eighth and ninth is $d_{17}$, a focal length of the eighth lens is $f_8$, a total focal length of the ninth and tenth lens is $f_{9,10}$, and a total focal length of the entire system is f.

5. A projection lens according to claim 2, satisfying substantially the following conditions:

| f = 49.86 | | | | Aperture ratio | 1:2.8 | | |
|---|---|---|---|---|---|---|---|
| Projection magnification | 16.89 | | | $\omega = 36.2°$ | | | |
| $f_{1,7}/f = 1.08$ | | | | $d_{15}/f = 0.72$ | | | |
| $d_{17}/f = 0.12$ | | | | $f_8/f_{9,10} = -1.42$ | | | |
| $r_1 =$ | 136.783 | $d_1 =$ | 8.10 | $n_1 = 1.51825$ | $\nu_1 = 63.8$ |
| $r_2 =$ | 961.173 | $d_2 =$ | 5.18 | | |
| $r_3 =$ | 69.975 | $d_3 =$ | 6.00 | $n_2 = 1.51825$ | $\nu_2 = 63.8$ |
| $r_4 =$ | 27.036 | $d_4 =$ | 8.97 | | |
| $r_5 =$ | 121.495 | $d_5 =$ | 2.21 | $n_3 = 1.52555$ | $\nu_3 = 50.5$ |
| $r_6 =$ | 29.715 | $d_6 =$ | 18.76 | | |
| $r_7 =$ | 74.902 | $d_7 =$ | 17.33 | $n_4 = 1.85503$ | $\nu_4 = 23.7$ |
| $r_8 =$ | 327.104 | $d_8 =$ | 6.68 | | |
| $r_9 =$ | 271.686 | $d_9 =$ | 17.77 | $n_5 = 1.79013$ | $\nu_5 = 43.9$ |
| $r_{10} =$ | −25.786 | $d_{10}$ | 2.00 | $n_6 = 1.76169$ | $\nu_6 = 27.3$ |
| $r_{11} =$ | 74.081 | $d_{11}$ | 4.62 | | |
| $r_{12} =$ | −81.511 | $d_{12}$ | 4.50 | $n_7 = 1.77622$ | $\nu_7 = 49.4$ |
| $r_{13} =$ | 43.199 | $d_{13}$ | 1.49 | | |

-continued

| | | | | | | | |
|---|---|---|---|---|---|---|---|
| $r_{14} =$ | 204.097 | $d_{14} =$ | 4.11 | $n_8 =$ | 1.79196 | $\nu_8 =$ | 47.1 |
| $r_{15} =$ | −122.218 | $d_{15} =$ | 35.89 | | | | |
| $r_{16} =$ | −68.864 | $d_{16} =$ | 2.66 | $n_9 =$ | 1.61075 | $\nu_9 =$ | 40.0 |
| $r_{17} =$ | 275.832 | $d_{17} =$ | 6.11 | | | | |
| $r_{18} =$ | −1075.96 | $d_{18} =$ | 10.52 | $n_{10} =$ | 1.68083 | $\nu_{10} =$ | 55.1 |
| $r_{19} =$ | −88.713 | $d_{19} =$ | 0.25 | | | | |
| $r_{20} =$ | 128.275 | $d_{20} =$ | 10.01 | $n_{11} =$ | 1.7762 | $\nu_{11} =$ | 49.4 |
| $r_{21} =$ | −276.533 | $d_{21} =$ | 4.70 | | | | |
| $r_{22} =$ | 0.000 | $d_{22} =$ | 41.10 | $n_{12} =$ | 1.51825 | $\nu_{12} =$ | 63.8 |
| $r_{23} =$ | 0.000 | | | | | | | where $r_1, r_2, \ldots$ are a radius of curvature of each surface starting from the screen side, $d_1, d_2, \ldots$ are a distance between each of said surfaces, $n_1, n_2, \ldots$ are a refractive index at an e-line of each lens, and $\nu_1, \nu_2, \ldots$ are an Abbe's number corresponding to the e-line of each of the above lens.

6. A projection lens according to claim 2, wherein at least one surface of the first, second, eighth, ninth and tenth lenses has an aspheric surface.

7. A projection lens according to claim 6, satisfying substantially the following conditions:

| | | | |
|---|---|---|---|
| $f = 49.82$ | | Aperture 1:2.8 ratio | |
| Projection magnification 16.94 | | $\omega = 36.2°$ | |
| $f_{1.7}/f = 1.05$ | | $d_{15}/f = 0.74$ | |
| $d_{17}/f = 0.16$ | | $f_8/f_{9.10} = -1.33$ | |

| | | | | | | | |
|---|---|---|---|---|---|---|---|
| $r_1 =$ | 104.034 | $d_1 =$ | 11.00 | $n_1 =$ | 1.49384 | $\nu_1 =$ | 57.4 * |
| $r_2 =$ | 466.780 | $d_2 =$ | 5.00 | | | | * |
| $r_3 =$ | 73.295 | $d_3 =$ | 2.00 | $n_2 =$ | 1.49384 | $\nu_2 =$ | 57.4 * |
| $r_4 =$ | 26.295 | $d_4 =$ | 11.00 | | | | * |
| $r_5 =$ | 121.495 | $d_5 =$ | 2.21 | $n_3 =$ | 1.52555 | $\nu_3 =$ | 50.5 |
| $r_6 =$ | 29.715 | $d_6 =$ | 18.76 | | | | |
| $r_7 =$ | 74.902 | $d_7 =$ | 17.33 | $n_4 =$ | 1.85503 | $\nu_4 =$ | 23.7 |
| $r_8 =$ | −372.104 | $d_8 =$ | 6.68 | | | | |
| $r_9 =$ | 271.686 | $d_9 =$ | 17.77 | $n_5 =$ | 1.79013 | $\nu_5 =$ | 43.9 |
| $r_{10} =$ | −25.786 | $d_{10} =$ | 2.00 | $n_6 =$ | 1.76169 | $\nu_6 =$ | 27.3 |
| $r_{11} =$ | 74.081 | $d_{11} =$ | 4.62 | | | | |
| $r_{12} =$ | −81.511 | $d_{12} =$ | 4.50 | $n_7 =$ | 1.77622 | $\nu_7 =$ | 49.4 |
| $r_{13} =$ | −43.199 | $d_{13} =$ | 1.49 | | | | |
| $r_{14} =$ | 204.097 | $d_{14} =$ | 4.11 | $n_8 =$ | 1.79196 | $\nu_8 =$ | 47.1 |
| $r_{15} =$ | −122.218 | $d_{15} =$ | 35.89 | | | | |
| $r_{16} =$ | −62.109 | $d_{16} =$ | 2.66 | $n_9 =$ | 1.61075 | $\nu_9 =$ | 40.0 |
| $r_{17} =$ | 213.114 | $d_{17} =$ | 7.80 | | | | |
| $r_{18} =$ | 847.406 | $d_{18} =$ | 10.30 | $n_{10} =$ | 1.68083 | $\nu_{10} =$ | 55.1 |
| $r_{19} =$ | −95.951 | $d_{19} =$ | 0.63 | | | | |
| $r_{20} =$ | 121.641 | $d_{20} =$ | 10.45 | $n_{11} =$ | 1.77622 | $\nu_{11} =$ | 49.4 |
| $r_{21} =$ | −255.505 | $d_{21} =$ | 4.50 | | | | |
| $r_{22} =$ | 0.000 | $d_{22} =$ | 41.10 | $n_{12} =$ | 1.51825 | $\nu_{12} =$ | 63.8 |
| $r_{23} =$ | 0.000 | | | | | | |

Aspheric coefficient
First surface:

-continued

| | | | |
|---|---|---|---|
| $K =$ | 0.655275 | $AD =$ | $0.626082 \times 10^{-7}$ |
| $AE =$ | $-0.144786 \times 10^{-10}$ | $AF =$ | $-0.109334 \times 10^{-14}$ |

Second surface:
$K = 0.367907 \times 10^2$

Third surface:
| | | | |
|---|---|---|---|
| $K =$ | 0.440304 | $AD =$ | $0.126898 \times 10^{-7}$ |
| $AE =$ | $0.634832 \times 10^{-11}$ | $AF =$ | $0.928375 \times 10^{-14}$ |

Fourth surface:
| | | | |
|---|---|---|---|
| $K =$ | $-0.241861 \times 10^{-1}$ | $AD =$ | $0.166124 \times 10^{-6}$ |
| $AE =$ | $0.434466 \times 10^{-9}$ | $AF =$ | $0.561828 \times 10^{-12}$ | where $r_1, r_2, \ldots$ represent a radius of curvature of each surface starting from the screen side, $d_1, d_2, \ldots$ represent a distance between each of said surfaces, $n_1, n_2, \ldots$ represent a refractive index at an e-line of each lens, $\nu_1, \nu_2, \ldots$ represent an Abbe's number corresponding to the e-line of each of the above lens, surfaces represented by * $\ldots$ are the aspheric surfaces, and if Z is supposed a displacement amount from a vertex of a lens at a position away from an optical axis of the lens in a radius distance Y of an opening, it can be expressed as $$Z = \frac{Y^2/r}{1 + \sqrt{1 - (K+1) \cdot (Y/r)^2}} + AD \cdot Y^4 + AE \cdot Y^6 + AF \cdot Y^8 + AG \cdot Y^{10}$$

and where AD, AE, AF, and AG are aspherical coefficients and K is a conical constant.

8. A projection lens according to claim 6, satisfying substantially the following conditions:

| | | | |
|---|---|---|---|
| $f = 52.47$ | | Aperture 1:2.8 ratio | |
| Projection magnification 17.19 | | $\omega = 33.8°$ | |
| $f_{1.7}/f = 1.09$ | | $d_{15}/f = 0.64$ | |
| $d_{17}/f = 0.12$ | | $f_8/f_{9.10} = -1.31$ | |

| | | | | | | | |
|---|---|---|---|---|---|---|---|
| $r_1 =$ | 148.519 | $d_1 =$ | 8.40 | $n_1 =$ | 1.51825 | $\nu_1 =$ | 63.8 * |
| $r_2 =$ | −6939.731 | $d_2 =$ | 5.18 | | | | |
| $r_3 =$ | 49.137 | $d_3 =$ | 6.00 | $n_2 =$ | 1.51825 | $\nu_2 =$ | 63.8 |
| $r_4 =$ | 29.177 | $d_4 =$ | 9.37 | | | | * |
| $r_5 =$ | 608.860 | $d_5 =$ | 2.21 | $n_3 =$ | 1.52555 | $\nu_3 =$ | 50.5 |
| $r_6 =$ | 28.525 | $d_6 =$ | 18.76 | | | | |
| $r_7 =$ | 74.902 | $d_7 =$ | 17.33 | $n_4 =$ | 1.85503 | $\nu_4 =$ | 23.7 |
| $r_8 =$ | −372.104 | $d_8 =$ | 6.68 | | | | |
| $r_9 =$ | 271.686 | $d_9 =$ | 17.77 | $n_5 =$ | 1.79013 | $\nu_5 =$ | 43.9 |
| $r_{10} =$ | −25.786 | $d_{10} =$ | 2.00 | $n_6 =$ | 1.76169 | $\nu_6 =$ | 27.3 |
| $r_{11} =$ | 74.081 | $d_{11} =$ | 4.62 | | | | |
| $r_{12} =$ | −81.511 | $d_{12} =$ | 4.50 | $n_7 =$ | 1.77622 | $\nu_7 =$ | 49.4 |
| $r_{13} =$ | −43.199 | $d_{13} =$ | 1.49 | | | | |
| $r_{14} =$ | 204.097 | $d_{14} =$ | 4.11 | $n_8 =$ | 1.79196 | $\nu_8 =$ | 47.1 |
| $r_{15} =$ | −122.218 | $d_{15} =$ | 33.60 | | | | |
| $r_{16} =$ | −49.674 | $d_{16} =$ | 2.66 | $n_9 =$ | 1.62059 | $\nu_9 =$ | 36.4 |
| $r_{17} =$ | 298.959 | $d_{17} =$ | 6.11 | | | | * |
| $r_{18} =$ | −275.028 | $d_{18} =$ | 10.70 | $n_{10} =$ | 1.68083 | $\nu_{10} =$ | 55.1 * |
| $r_{19} =$ | −56.037 | $d_{19} =$ | 0.25 | | | | |
| $r_{20} =$ | 341.327 | $d_{20} =$ | 11.05 | $n_{11} =$ | 1.77622 | $\nu_{11} =$ | 49.4 * |
| $r_{21} =$ | −103.830 | $d_{21} =$ | 6.70 | | | | |
| $r_{22} =$ | 0.000 | $d_{22} =$ | 43.30 | $n_{12} =$ | 1.51825 | $\nu_{12} =$ | 63.8 |

-continued

| | | | |
|---|---|---|---|
| $r_{23} =$ | 0.000 | | |

Aspheric coefficient

First surface:
- $K = -0.2749912 \times 10^{-1}$    $AD = 0.2548179 \times 10^{-7}$
- $AE = -0.2056712 \times 10^{-10}$   $AF = -0.4319405 \times 10^{-14}$
- $AG = 0.8811238 \times 10^{-18}$ Fourth surface:
- $K = 0.3668809 \times 10^{-1}$    $AD = 0.1536691 \times 10^{-6}$
- $AE = -0.1142634 \times 10^{-10}$   $AF = 0.8573753 \times 10^{-12}$
- $AG = 0.2158643 \times 10^{-15}$ Seventeenth surface:
- $K = 0.2637872 \times 10^{2}$    $AD = 0.1858271 \times 10^{-6}$
- $AE = 0.1334531 \times 10^{-10}$   $AF = 0.2612238 \times 10^{-13}$
- $AG = 0.9178511 \times 10^{-17}$ Eighteenth surface:
- $K = 0.5903051 \times 10^{1}$    $AD = -0.2472130 \times 10^{-6}$
- $AE = 0.1460313 \times 10^{-9}$    $AF = 0.3400976 \times 10^{-13}$
- $AG = 0.3706282 \times 10^{-17}$ Twentieth surface:
- $K = -0.9201606$           $AD = -0.1022347 \times 10^{-6}$
- $AE = 0.7465995 \times 10^{-10}$   $AF = 0.1567219 \times 10^{-13}$
- $AG = 0.1032802 \times 10^{-17}$ where $r_1, r_2, \ldots$ represent a radius of curvature of each surface starting from the screen side, $d_1, d_2, \ldots$ represent a distance between each of said surfaces, $n_1, n_2, \ldots$ represent a refractive index at an e-line of each lens, $\nu_1, \nu_2, \ldots$ represent an Abbe's number corresponding to the e-line of each of the above lens, surfaces represented by * . . . are the aspheric surfaces, and if Z is supposed a displacement amount from a vertex of a lens at a position away from an optical axis of the lens in radius distance Y of an opening, it can be expressed as $$Z = \frac{Y^2/r}{1 + \sqrt{1 - (K + 1) \cdot (Y/r)^2}} + AD \cdot Y^4 + AE \cdot Y^6 + AF \cdot Y^8 + AG \cdot Y^{10}$$

and where AD, AE, AF, and AG are aspherical coefficients, and K is a conical constant.

9. A projection lens according to claim 6, satisfying substantially the following conditions:

| | | | |
|---|---|---|---|
| $f = 49.94$ | | Aperture ratio | 1:2.8 |
| Projection magnification | 18.09 | $\omega = 34.1°$ | |
| $f_{1.7}/f = 1.14$ | | $d_{15}/f = 0.67$ | |
| $d_{17}/f = 0.12$ | | $f_8/f_{9.10} = -1.37$ | |
| $r_1 =$ | 146.163 | $d_1 =$ | 8.40 | $n_1 = 1.51825$ | $\nu_1 = 63.8$ | * |
| $r_2 =$ | 0.000 | $d_2 =$ | 5.18 | | | |
| $r_3 =$ | 49.670 | $d_3 =$ | 6.00 | $n_2 = 1.51825$ | $\nu_2 = 63.8$ | |
| $r_4 =$ | 29.101 | $d_4 =$ | 9.39 | | | * |
| $r_5 =$ | 937.536 | $d_5 =$ | 2.21 | $n_3 = 1.52555$ | $\nu_3 = 50.5$ | |
| $r_6 =$ | 28.141 | $d_6 =$ | 18.76 | | | |
| $r_7 =$ | 74.902 | $d_7 =$ | 17.33 | $n_4 = 1.85503$ | $\nu_4 = 23.7$ | |
| $r_8 =$ | -372.104 | $d_8 =$ | 6.68 | | | |
| $r_9 =$ | 271.686 | $d_9 =$ | 17.77 | $n_5 = 1.79013$ | $\nu_5 = 43.9$ | |
| $r_{10} =$ | -25.786 | $d_{10}$ | 2.00 | $n_6 = 1.76169$ | $\nu_6 = 27.3$ | |
| $r_{11} =$ | 74.081 | $d_{11}$ | 4.62 | | | |
| $r_{12} =$ | -81.511 | $d_{12}$ | 4.50 | $n_7 = 1.77622$ | $\nu_7 = 49.4$ | |
| $r_{13} =$ | -43.199 | $d_{13}$ | 1.49 | | | |
| $r_{14} =$ | 204.097 | $d_{14}$ | 4.11 | $n_8 = 1.79196$ | $\nu_8 = 47.1$ | |
| $r_{15} =$ | -122.218 | $d_{15}$ | 33.60 | | | |
| $r_{16} =$ | -49.674 | $d_{16}$ | 2.66 | $n_9 = 1.62059$ | $\nu_9 = 36.4$ | |
| $r_{17} =$ | 303.305 | $d_{17}$ | 6.11 | | | * |
| $r_{18} =$ | -310.381 | $d_{18}$ | 10.70 | $n_{10} = 1.68083$ | $\nu_{10} = 55.1$ | * |
| $r_{19} =$ | -54.486 | $d_{19}$ | 0.25 | | | |
| $r_{20} =$ | 275.356 | $d_{20}$ | 11.05 | $n_{11} = 1.77622$ | $\nu_{11} = 49.4$ | * |
| $r_{21} =$ | -108.456 | $d_{21}$ | 6.70 | | | |
| $r_{22} =$ | 0.000 | $d_{22}$ | 43.30 | $n_{12} = 1.51825$ | $\nu_{12} = 63.8$ | |
| $r_{23} =$ | 0.000 | | | | | |

Aspheric coefficient

First surface:
- $K = -0.2301050 \times 10^{-1}$    $AD = 0.2511178 \times 10^{-7}$
- $AE = -0.1943356 \times 10^{-10}$   $AF = -0.3619595 \times 10^{-14}$
- $AG = 0.8095271 \times 10^{-18}$ Fourth surface:
- $K = 0.3295092 \times 10^{-1}$    $AD = -0.4594244 \times 10^{-7}$
- $AE = 0.7461787 \times 10^{-10}$   $AF = 0.4135199 \times 10^{-12}$
- $AG = -0.3071122 \times 10^{-15}$ Seventeenth surface:
- $K = 0.2504243 \times 10^{2}$    $AD = 0.1782731 \times 10^{-6}$
- $AE = -0.1529465 \times 10^{-11}$   $AF = 0.2164382 \times 10^{-13}$
- $AG = -0.7725707 \times 10^{-17}$ Eighteenth surface:
- $K = 0.1032711 \times 10^{-2}$    $AD = -0.2772488 \times 10^{-6}$
- $AE = 0.1544648 \times 10^{-9}$    $AF = 0.2193979 \times 10^{-13}$
- $AG = -0.1042978 \times 10^{-16}$ Twentieth surface:
- $K = -0.5525461 \times 10^{1}$    $AD = -0.1231838 \times 10^{-6}$
- $AE = 0.8516421 \times 10^{-10}$   $AF = 0.1510178 \times 10^{-13}$
- $AG = 0.1229936 \times 10^{-18}$ where $r_1, r_2, \ldots$ represent a radius of curvature of each surface starting from the screen side, $d_1, d_2, \ldots$ represent a distance between each of said surfaces, $n_1, n_2, \ldots$ represent a refractive index at an e-line of each lens, $\nu_1, \nu_2, \ldots$ represent an Abbe's number corresponding to the e-line of each of the above lens, surfaces represented by * . . . are the aspheric surfaces, and if Z is supposed a displacement amount from a vertex of a lens at a position away from an optical axis of the lens in a radius distance Y of an opening, it can be expressed as $$Z = \frac{Y^2/r}{1 + \sqrt{1 - (K + 1) \cdot (Y/r)^2}} + AD \cdot Y^4 + AE \cdot Y^6 + AF \cdot Y^8 + AG \cdot Y^{10}$$

and where AD, AE, AF, and AG are aspherical coefficients, and K is a conical constant.

10. A projection lens according to claim 6, satisfying substantially the following conditions:

| | | | |
|---|---|---|---|
| $f = 50.00$ | | Aperture ratio | 1:2.8 |
| Projection magnification | 18.10 | $\omega = 34.0°$ | |
| $f_{1.7}/f = 1.14$ | | $d_{15}/f = 0.67$ | |
| $d_{17}/f = 0.12$ | | $f_8/f_{9.10} = -1.35$ | |
| $r_1 = 139.093$ | $d_1 = 8.40$ | $n_1 = 1.51825$ | $\nu_1 = 63.8$ * |
| $r_2 = 1883.809$ | $d_2 = 5.18$ | | |
| $r_3 = 44.322$ | $d_3 = 6.00$ | $n_2 = 1.51825$ | $\nu_2 = 63.8$ |
| $r_4 = 26.610$ | $d_4 = 11.06$ | | |
| $r_5 = 1031.968$ | $d_5 = 2.21$ | $n_3 = 1.52555$ | $\nu_3 = 50.5$ |
| $r_6 = 28.804$ | $d_6 = 18.76$ | | |
| $r_7 = 74.902$ | $d_7 = 17.33$ | $n_4 = 1.85503$ | $\nu_4 = 23.7$ |
| $r_8 = -372.104$ | $d_8 = 6.68$ | | |
| $r_9 = 271.686$ | $d_9 = 17.77$ | $n_5 = 1.79013$ | $\nu_5 = 43.9$ |

-continued

| | | | |
|---|---|---|---|
| $r_{10} = -25.786$ | $d_{10} = 2.00$ | $n_6 = 1.76169$ | $\nu_6 = 27.3$ |
| $r_{11} = 74.081$ | $d_{11} = 4.62$ | | |
| $r_{12} = -81.511$ | $d_{12} = 4.50$ | $n_7 = 1.77622$ | $\nu_7 = 49.4$ |
| $r_{13} = -43.199$ | $d_{13} = 1.49$ | | |
| $r_{14} = 204.097$ | $d_{14} = 4.11$ | $n_8 = 1.79196$ | $\nu_8 = 47.1$ |
| $r_{15} = -122.218$ | $d_{15} = 33.60$ | | |
| $r_{16} = -48.652$ | $d_{16} = 2.66$ | $n_9 = 1.62059$ | $\nu_9 = 36.4$* |
| $r_{17} = 293.965$ | $d_{17} = 6.11$ | | |
| $r_{18} = -406.452$ | $d_{18} = 10.70$ | $n_{10} = 1.68083$ | $\nu_{10} = 55.1$* |
| $r_{19} = -56.325$ | $d_{19} = 0.25$ | | |
| $r_{20} = 243.391$ | $d_{20} = 11.05$ | $n_{11} = 1.77622$ | $\nu_{11} = 49.4$ |
| $r_{21} = -112.964$ | $d_{21} = 6.70$ | | |
| $r_{22} = 0.000$ | $d_{22} = 43.30$ | $n_{12} = 1.51825$ | $\nu_{12} = 63.8$ |
| $r_{23} = 0.000$ | | | |

Aspheric coefficient

First surface:
$K = 0.3664325$     $AD = 0.4574458 \times 10^{-7}$
$AE = -0.3507965 \times 10^{-10}$     $AF = 0.2388062 \times 10^{-14}$
$AG = 0.2247566 \times 10^{-19}$ Seventeenth surface:
$K = 0.1229070 \times 10^2$     $AD = 0.9272514 \times 10^{-7}$
$AE = -0.3770400 \times 10^{-10}$     $AF = 0.1428259 \times 10^{-12}$
$AG = 0.5601794 \times 10^{-16}$ Eighteenth surface:
$K = 0.2118076 \times 10^2$     $AD = -0.4127061 \times 10^{-6}$
$AE = 0.2205876 \times 10^{-9}$     $AF = 0.6059036 \times 10^{-13}$
$AG = 0.6235547 \times 10^{-16}$ where $r_1, r_2, \ldots$ represent a radius of curvature of each surface starting from the screen side, $d_1, d_2, \ldots$ represent a distance between each of said surfaces, $n_1, n_2, \ldots$ represent a refractive index at an e-line of each lens, $\nu_1, \nu_2, \ldots$ represent an Abbe's number corresponding to the e-line of each of the above lens, surfaces represented by * ... are the aspheric surfaces, and if Z is supposed a displacement amount from a vertex of a lens at a position away from an optical axis of the lens in a radius distance Y of an opening, it can be expressed as $$Z = \frac{Y^2/r}{1 + \sqrt{1 - (K+1) \cdot (Y/r)^2}} + AD \cdot Y^4 + AE \cdot Y^6 + AF \cdot Y^8 + AG \cdot Y^{10}$$

and where AD, AE, AF, and AG are aspherical coefficients, and K is a conical constant.

11. A projection lens according to claim 6, satisfying substantially the following conditions:

| $f = 50.15$ | | Aperture ratio | 1:2.8 |
|---|---|---|---|
| Projection magnification | 18.09 | $\omega = 34.1°$ | |
| $f_{1.7}/f = 1.15$ | | $d_{15}/f = 0.67$ | |
| $d_{17}/f = 0.12$ | | $f_8/f_{9.10} = -1.33$ | |
| $r_1 = 138.102$ | $d_1 = 8.40$ | $n_1 = 1.51825$ | $\nu_1 = 63.8$* |
| $r_2 = 3278.162$ | $d_2 = 5.18$ | | |
| $r_3 = 48.685$ | $d_3 = 6.00$ | $n_2 = 1.51825$ | $\nu_2 = 63.8$ |
| $r_4 = 29.654$ | $d_4 = 11.06$ | | |
| $r_5 = 1869.065$ | $d_5 = 2.21$ | $n_3 = 1.52555$ | $\nu_3 = 50.5$ |
| $r_6 = 27.929$ | $d_6 = 18.76$ | | |
| $r_7 = 74.902$ | $d_7 = 17.33$ | $n_4 = 1.85503$ | $\nu_4 = 23.7$ |
| $r_8 = -372.104$ | $d_8 = 6.68$ | | |
| $r_9 = 271.686$ | $d_9 = 17.77$ | $n_5 = 1.79013$ | $\nu_5 = 43.9$ |
| $r_{10} = -25.786$ | $d_{10} = 2.00$ | $n_6 = 1.76169$ | $\nu_6 = 27.3$ |
| $r_{11} = 74.081$ | $d_{11} = 4.62$ | | |
| $r_{12} = -81.511$ | $d_{12} = 4.50$ | $n_7 = 1.77622$ | $\nu_7 = 49.4$ |
| $r_{13} = -43.199$ | $d_{13} = 1.49$ | | |
| $r_{14} = 204.097$ | $d_{14} = 4.11$ | $n_8 = 1.79196$ | $\nu_8 = 47.1$ |
| $r_{15} = -122.218$ | $d_{15} = 33.60$ | | |
| $r_{16} = -45.791$ | $d_{16} = 2.66$ | $n_9 = 1.62059$ | $\nu_9 = 36.4$* |
| $r_{17} = 288.771$ | $d_{17} = 6.11$ | | |
| $r_{18} = -339.448$ | $d_{18} = 11.20$ | $n_{10} = 1.68083$ | $\nu_{10} = 55.1$ |
| $r_{19} = -52.879$ | $d_{19} = 0.25$ | | |
| $r_{20} = 237.092$ | $d_{20} = 11.05$ | $n_{11} = 1.77622$ | $\nu_{11} = 49.4$* |
| $r_{21} = -107.581$ | $d_{21} = 6.70$ | | |
| $r_{22} = 0.000$ | $d_{22} = 43.30$ | $n_{12} = 1.51825$ | $\nu_{12} = 63.8$ |
| $r_{23} = 0.000$ | | | |

Aspheric coefficient

First surface:
$K = -0.8676696$     $AD = 0.4922937 \times 10^{-7}$
$AE = -0.2681624 \times 10^{-10}$     $AF = 0.4039305 \times 10^{-14}$
$AG = -0.6315714 \times 10^{-18}$ Seventeenth surface:
$K = 0.1204351 \times 10^2$     $AD = 0.8134826 \times 10^{-7}$
$AE = 0.3285905 \times 10^{-11}$     $AF = -0.3382158 \times 10^{-13}$
$AG = 0.1685514 \times 10^{-16}$ Eighteenth surface:
$K = -0.1760054 \times 10^2$     $AD = -0.2229407 \times 10^{-6}$
$AE = 0.8474120 \times 10^{-10}$     $AF = 0.3501296 \times 10^{-13}$
$AG = -0.6162020 \times 10^{-17}$ where $r_1, r_2, \ldots$ represent a radius of curvature of each surface starting from the screen side, $d_1, d_2, \ldots$ represent a distance between each of said surfaces, $n_1, n_2, \ldots$ represent a refractive index at an e-line of each lens, $\nu_1, \nu_2, \ldots$ represent an Abbe's number corresponding to the e-line of each of the above lens, surfaces represented by * ... are the aspheric surfaces, and if Z is supposed a displacement amount from a vertex of a lens at a position away from an optical axis of the lens in a radius distance Y of an opening, it can be expressed as $$Z = \frac{Y^2/r}{1 + \sqrt{1 - (K+1) \cdot (Y/r)^2}} + AD \cdot Y^4 + AE \cdot Y^6 + AF \cdot Y^8 + AG \cdot Y^{10}$$

and where AD, AE, AF, and AG are aspherical coefficients, and K is a conical constant.

12. A projection lens according to claim 6, satisfying substantially the following conditions:

| $f = 49.98$ | | Aperture ratio | 1:2.8 |
|---|---|---|---|
| Projection magnification | 18.09 | $\omega = 34.2°$ | |
| $f_{1.7}/f = 1.16$ | | $d_{15}/f = 0.67$ | |
| $d_{17}/f = 0.12$ | | $f_8/f_{9.10} = -1.33$ | |
| $r_1 = 97.304$ | $d_1 = 8.40$ | $n_1 = 1.51825$ | $\nu_1 = 63.8$ |
| $r_2 = 419.135$ | $d_2 = 5.18$ | | |
| $r_3 = 71.654$ | $d_3 = 6.00$ | $n_2 = 1.51825$ | $\nu_2 = 63.8$ |
| $r_4 = 34.797$ | $d_4 = 7.04$ | | |
| $r_5 = 373.100$ | $d_5 = 2.21$ | $n_3 = 1.52555$ | $\nu_3 = 50.5$ |
| $r_6 = 27.138$ | $d_6 = 18.76$ | | |
| $r_7 = 74.902$ | $d_7 = 17.33$ | $n_4 = 1.85503$ | $\nu_4 = 23.7$ |
| $r_8 = -372.104$ | $d_8 = 6.68$ | | |
| $r_9 = 271.686$ | $d_9 = 17.77$ | $n_5 = 1.79013$ | $\nu_5 = 43.9$ |
| $r_{10} = -25.786$ | $d_{10} = 2.00$ | $n_6 = 1.76169$ | $\nu_6 = 27.3$ |
| $r_{11} = 74.081$ | $d_{11} = 4.62$ | | |
| $r_{12} = -81.511$ | $d_{12} = 4.50$ | $n_7 = 1.77622$ | $\nu_7 = 49.4$ |
| $r_{13} = -43.199$ | $d_{13} = 1.49$ | | |
| $r_{14} = 204.097$ | $d_{14} = 4.11$ | $n_8 = 1.79196$ | $\nu_8 = 47.1$ |
| $r_{15} = -122.218$ | $d_{15} = 33.60$ | | |
| $r_{16} = -47.158$ | $d_{16} = 2.66$ | $n_9 = 1.62059$ | $\nu_9 = 36.4$* |
| $r_{17} = 234.453$ | $d_{17} = 6.11$ | | |
| $r_{18} = -282.754$ | $d_{18} = 10.70$ | $n_{10} = 1.68083$ | $\nu_{10} = 55.1$* |
| $r_{19} = -50.375$ | $d_{19} = 0.25$ | | |
| $r_{20} = 387.424$ | $d_{20} = 11.05$ | $n_{11} = 1.77622$ | $\nu_{11} = 49.4$* |
| $r_{21} = -89.653$ | $d_{21} = 6.70$ | | |
| $r_{22} = 0.000$ | $d_{22} = 43.30$ | $n_{12} = 1.51825$ | $\nu_{12} = 63.8$ |
| $r_{23} = 0.000$ | | | |

Aspheric coefficient

Seventeenth surface:
$K = 0.3064228 \times 10^2$     $AD = 0.3424168 \times 10^{-6}$
$AE = 0.1524318 \times 10^{-11}$     $AF = 0.2578158 \times 10^{-14}$
$AG = -0.1657459 \times 10^{-16}$ -continued Eighteenth surface:
K = −0.1540423 × 10²  AD = −0.1423166 × 10⁻⁶
AE = 0.2421751 × 10⁻⁹  AF = 0.9010286 × 10⁻¹³
AG = 0.6174771 × 10⁻¹⁶
Twentieth surface:
K = −0.1023903 × 10³  AD = −0.2301108 × 10⁻⁶
AE = 0.1076672 × 10⁻⁹  AF = −0.1514403 × 10⁻¹⁴
AG = −0.3385086 × 10⁻¹⁷ where $r_1, r_2, \ldots$ represent a radius of curvature of each surface starting from the screen side, $d_1, d_2, \ldots$ represent a distance between each of said surfaces, $n_1, n_2, \ldots$ represent a refractive index at an e-line of each lens, $\nu_1, \nu_2, \ldots$ represent an Abbe's number corresponding to the e-line of each of the above lens, surfaces represented by * ... are the aspheric surfaces, and if Z is supposed a displacement amount from a vertex of a lens at a position away from an optical axis of the lens in a radius distance Y of an opening, it can be expressed as $$Z = \frac{Y^2/r}{1 + \sqrt{1 - (K + 1) \cdot (Y/r)^2}} +$$

$$AD \cdot Y^4 + AE \cdot Y^6 + AF \cdot Y^8 + AG \cdot Y^{10}$$

and where AD, AE, AF, and AG are aspherical coefficients, and K is a conical constant.

13. A projection lens according to claim 6, satisfying substantially the following conditions:

| f = 50.09 | | Aperture ratio | 1:2.8 |
|---|---|---|---|
| Projection magnification | 18.09 | ω = 34.1° | |
| $f_{1.7}/f$ = 1.13 | | $d_{15}/f$ = 0.67 | |
| $d_{17}/f$ = 0.12 | | $f_8/f_{9.10}$ = −1.34 | |
| $r_1$ = 100.392 | $d_1$ = 8.40 | $n_1$ = 1.51825 | $\nu_1$ = 63.8* |
| $r_2$ = 203.275 | $d_2$ = 5.18 | | |
| $r_3$ = 39.627 | $d_3$ = 6.00 | $n_2$ = 1.51825 | $\nu_2$ = 63.8 |
| $r_4$ = 24.889 | $d_4$ = 12.47 | | |
| $r_5$ = 566.809 | $d_5$ = 2.21 | $n_3$ = 1.52555 | $\nu_3$ = 50.5 |
| $r_6$ = 29.209 | $d_6$ = 18.76 | | |
| $r_7$ = 74.902 | $d_7$ = 17.33 | $n_4$ = 1.85503 | $\nu_4$ = 23.7 |
| $r_8$ = −372.104 | $d_8$ = 6.68 | | |
| $r_9$ = 271.686 | $d_9$ = 17.77 | $n_5$ = 1.79013 | $\nu_5$ = 43.9 |
| $r_{10}$ = −25.786 | $d_{10}$ = 2.00 | $n_6$ = 1.76169 | $\nu_6$ = 27.3 |
| $r_{11}$ = 74.081 | $d_{11}$ = 4.62 | | |
| $r_{12}$ = −81.511 | $d_{12}$ = 4.50 | $n_7$ = 1.77622 | $\nu_7$ = 49.4 |
| $r_{13}$ = −43.199 | $d_{13}$ = 1.49 | | |
| $r_{14}$ = 204.097 | $d_{14}$ = 4.11 | $n_8$ = 1.79196 | $\nu_8$ = 47.1 |
| $r_{15}$ = −122.218 | $d_{15}$ = 35.89 | | |
| $r_{16}$ = −49.808 | $d_{16}$ = 2.66 | $n_9$ = 1.62059 | $\nu_9$ = 36.4 |
| $r_{17}$ = 275.553 | $d_{17}$ = 6.11 | | * |
| $r_{18}$ = −519.026 | $d_{18}$ = 10.70 | $n_{10}$ = 1.68083 | $\nu_{10}$ = 55.1 |
| $r_{19}$ = −60.159 | $d_{19}$ = 0.25 | | |
| $r_{20}$ = 250.814 | $d_{20}$ = 11.05 | $n_{11}$ = 1.77622 | $\nu_{11}$ = 49.4 |
| $r_{21}$ = −108.683 | $d_{21}$ = 6.70 | | |
| $r_{22}$ = 0.000 | $d_{22}$ = 43.30 | $n_{12}$ = 1.51825 | $\nu_{12}$ = 63.8 |
| $r_{23}$ = 0.000 | | | |

Aspheric coefficient

First surface:
K = 0.9525501  AD = 0.2216984 × 10⁻⁶
AE = −0.4500812 × 10⁻¹⁰  AF = 0.1270679 × 10⁻¹³
AG = −0.2481052 × 10⁻¹⁷
Seventeenth surface:
K = 0.3154613 × 10²  AD = 0.5889586 × 10⁻⁶
AE = −0.5654111 × 10⁻⁹  AF = 0.5498361 × 10⁻¹³
AG = 0.2775640 × 10⁻¹⁶ where $r_1, r_2, \ldots$ represent a radius of curvature of each surface starting from the screen side, $d_1, d_2, \ldots$ represent a distance between each of said surfaces, $n_1, n_2, \ldots$ represent a refractive index at an e-line of each lens, $\nu_1, \nu_2, \ldots$ represent an Abbe's number corresponding to the e-line of each of the above lens, surfaces represented by * ... are the aspheric surfaces, and if Z is supposed a displacement amount from a vertex of a lens at a position away from an optical axis of the lens in a radius distance Y of an opening, it can be expressed as $$Z = \frac{Y^2/r}{1 + \sqrt{1 - (K + 1) \cdot (Y/r)^2}} +$$

$$AD \cdot Y^4 + AE \cdot Y^6 + AF \cdot Y^8 + AG \cdot Y^{10}$$

and where AD, AE, AF, and AG are aspherical coefficients, and K is a conical constant.

14. A projection lens according to claim 6, satisfying substantially the following conditions:

| f = 49.91 | | Aperture ratio | 1:2.8 |
|---|---|---|---|
| Projection magnification | 18.07 | ω = 34.2° | |
| $f_{1.7}/f$ = 1.13 | | $d_{15}/f$ = 0.67 | |
| $d_{17}/f$ = 0.12 | | $f_8/f_{9.10}$ = −1.39 | |
| $r_1$ = 92.116 | $d_1$ = 8.40 | $n_1$ = 1.51825 | $\nu_1$ = 63.8* |
| $r_2$ = 256.167 | $d_2$ = 5.18 | | |
| $r_3$ = 60.670 | $d_3$ = 6.00 | $n_2$ = 1.51825 | $\nu_2$ = 63.8 |
| $r_4$ = 29.056 | $d_4$ = 8.80 | | |
| $r_5$ = 222.628 | $d_5$ = 2.21 | $n_3$ = 1.52555 | $\nu_3$ = 50.5 |
| $r_6$ = 28.187 | $d_6$ = 18.76 | | |
| $r_7$ = 74.902 | $d_7$ = 17.33 | $n_4$ = 1.85503 | $\nu_4$ = 23.7 |
| $r_8$ = −372.104 | $d_8$ = 6.68 | | |
| $r_9$ = 271.686 | $d_9$ = 17.77 | $n_5$ = 1.79013 | $\nu_5$ = 43.9 |
| $r_{10}$ = −25.786 | $d_{10}$ = 2.00 | $n_6$ = 1.76169 | $\nu_6$ = 27.3 |
| $r_{11}$ = 74.081 | $d_{11}$ = 4.62 | | |
| $r_{12}$ = −81.511 | $d_{12}$ = 4.50 | $n_7$ = 1.77622 | $\nu_7$ = 49.4 |
| $r_{13}$ = −43.199 | $d_{13}$ = 1.49 | | |
| $r_{14}$ = 204.097 | $d_{14}$ = 4.11 | $n_8$ = 1.79196 | $\nu_8$ = 47.1 |
| $r_{15}$ = −122.218 | $d_{15}$ = 35.89 | | |
| $r_{16}$ = −55.629 | $d_{16}$ = 2.66 | $n_9$ = 1.62059 | $\nu_9$ = 36.4 |
| $r_{17}$ = 243.662 | $d_{17}$ = 6.11 | | |
| $r_{18}$ = −319.338 | $d_{18}$ = 10.70 | $n_{10}$ = 1.68083 | $\nu_{10}$ = 55.1* |
| $r_{19}$ = −61.756 | $d_{19}$ = 0.25 | | |
| $r_{20}$ = 302.607 | $d_{20}$ = 11.05 | $n_{11}$ = 1.77622 | $\nu_{11}$ = 49.4 |
| $r_{21}$ = −96.776 | $d_{21}$ = 6.70 | | |
| $r_{22}$ = 0.000 | $d_{22}$ = 43.30 | $n_{12}$ = 1.51825 | $\nu_{12}$ = 63.8 |
| $r_{23}$ = 0.000 | | | |

Aspheric coefficient

First surface:
K = 0.3399632  AD = 0.7523389 × 10⁻⁷
AE = −0.6005325 × 10⁻¹⁰  AF = 0.2647887 × 10⁻¹³
AG = −0.5935675 × 10⁻¹⁷
Eighteenth surface:
K = 0.2756654 × 10²  AD = −0.7554289 × 10⁻⁶
AE = 0.3478933 × 10⁻⁹  AF = −0.7082334 × 10⁻¹³
AG = 0.2544740 × 10⁻¹⁶ where $r_1, r_2, \ldots$ represent a radius of curvature of each surface starting from the screen side, $d_1, d_2, \ldots$ represent a distance between each of said surfaces, $n_1, n_2, \ldots$ represent a refractive index at an e-line of each lens, $\nu_1, \nu_2, \ldots$ represent an Abbe's number corresponding to the e-line of each of the above lens, surfaces represented by * ... are the aspheric surfaces, and if Z is supposed a displacement amount from a vertex of a lens at a position away from an optical axis of the lens in a radius distance Y of an opening, it can be expressed as $$Z = \frac{Y^2/r}{1 + \sqrt{1 - (K + 1) \cdot (Y/r)^2}} +$$

$$AD \cdot Y^4 + AE \cdot Y^6 + AF \cdot Y^8 + AG \cdot Y^{10}$$

and where AD, AE, AF, and AG are aspherical coefficients, and K is a conical constant.

15. A projection lens according to claim 6, satisfying substantially the following conditions:

| f = 50.04 | | Aperture ratio | 1:2.8 |
|---|---|---|---|
| Projection magnification | 18.10 | $\omega = 34.2°$ | |
| $f_{1.7}/f = 1.14$ | | $d_{15}/f = 0.67$ | |
| $d_{17}/f = 0.12$ | | $f_8/f_{9.10} = -1.31$ | |
| $r_1 = 114.457$ | $d_1 = 8.40$ | $n_1 = 1.51825$ | $\nu_1 = 63.8*$ |
| $r_2 = 483.920$ | $d_2 = 5.18$ | | |
| $r_3 = 48.101$ | $d_3 = 6.00$ | $n_2 = 1.51825$ | $\nu_2 = 63.8$ |
| $r_4 = 28.146$ | $d_4 = 9.91$ | | |
| $r_5 = 575.308$ | $d_5 = 2.21$ | $n_3 = 1.52555$ | $\nu_3 = 50.5$ |
| $r_6 = 28.386$ | $d_6 = 18.76$ | | |
| $r_7 = 74.902$ | $d_7 = 17.33$ | $n_4 = 1.85503$ | $\nu_4 = 23.7$ |
| $r_8 = -372.104$ | $d_8 = 6.68$ | | |
| $r_9 = 271.686$ | $d_9 = 17.77$ | $n_5 = 1.79013$ | $\nu_5 = 43.9$ |
| $r_{10} = -25.786$ | $d_{10} = 2.00$ | $n_6 = 1.76169$ | $\nu_6 = 27.3$ |
| $r_{11} = 74.081$ | $d_{11} = 4.62$ | | |
| $r_{12} = -81.511$ | $d_{12} = 4.50$ | $n_7 = 1.77622$ | $\nu_7 = 49.4$ |
| $r_{13} = -43.199$ | $d_{13} = 1.49$ | | |
| $r_{14} = 204.097$ | $d_{14} = 4.11$ | $n_8 = 1.79196$ | $\nu_8 = 47.1$ |
| $r_{15} = -122.218$ | $d_{15} = 33.60$ | | |
| $r_{16} = -46.081$ | $d_{16} = 2.66$ | $n_9 = 1.62059$ | $\nu_9 = 36.4$ |
| $r_{17} = 228.576$ | $d_{17} = 6.11$ | | |
| $r_{18} = -509.475$ | $d_{18} = 10.70$ | $n_{10} = 1.68083$ | $\nu_{10} = 55.1$ |
| $r_{19} = -54.905$ | $d_{19} = 0.25$ | | |
| $r_{20} = 238.750$ | $d_{20} = 11.05$ | $n_{11} = 1.77622$ | $\nu_{11} = 49.4*$ |
| $r_{21} = -103.160$ | $d_{21} = 6.70$ | | |
| $r_{22} = 0.000$ | $d_{22} = 43.30$ | $n_{12} = 1.51825$ | $\nu_{12} = 63.8$ |
| $r_{23} = 0.000$ | | | |

Aspheric coefficient

First surface:
$K = 0.7070278$
$AE = -0.3754727 \times 10^{-10}$
$AG = -0.1657469 \times 10^{-17}$
$AD = 0.1345127 \times 10^{-7}$
$AF = 0.6046046 \times 10^{-14}$ Twentieth surface:
$K = -0.1850460 \times 10^2$
$AE = 0.6946116 \times 10^{-10}$
$AG = -0.5231959 \times 10^{-17}$
$AD = -0.2560358 \times 10^{-6}$
$AF = 0.3196880 \times 10^{-13}$ where $r_1, r_2, \ldots$ represent a radius of curvature of each surface starting from the screen side, $d_1, d_2, \ldots$ represent a distance between each of said surfaces, $n_1, n_2, \ldots$ represent a refractive index at an e-line of each lens, $\nu_1, \nu_2, \ldots$ represent an Abbe's number corresponding to the e-line of each of the above lens, surfaces represented by $* \ldots$ are the aspheric surfaces, and if Z is supposed a displacement amount from a vertex of a lens at a position away from an optical axis of the lens in a radius distance Y of an opening, it can be expressed as $$Z = \frac{Y^2/r}{1 + \sqrt{1 - (K+1) \cdot (Y/r)^2}} + AD \cdot Y^4 + AE \cdot Y^6 + AF \cdot Y^8 + AG \cdot Y^{10}$$

and where AD, AE, AF, and AG are aspherical coefficients, and K is a conical constant.

16. A projection lens for projecting on a screen a transmission or reflection light from an image display device which forms from a light emitted from a light source an image as changes of transmittance or reflectivity in response to an electric signal applied thereto, said projection lens comprising an inverted telephoto type front lens group at a screen side, and a rear lens group having a front focal point nearby an exit pupil of said front lens group, wherein said projection lens has telecentric characteristics and satisfies the following condition:

$$0.8 < f_1/f < 1.4$$

where $f_1$ is a total focal length of the front lens group, and f is a total focal length of the entire system.

17. A projection lens according to claim 16, satisfying the following condition:

$$0.5 < d_{15}/f < 0.9$$

where $d_{15}$ is a distance between opposing surfaces of the front and rear lens group.

* * * * *